United States Patent
Wahlberg et al.

(10) Patent No.: US 8,326,217 B2
(45) Date of Patent: Dec. 4, 2012

(54) SYSTEMS AND METHODS FOR SATELLITE COMMUNICATIONS WITH MOBILE TERRESTRIAL TERMINALS

(75) Inventors: Per Wahlberg, Nacka (SE); Kennet Lejnell, Ekero (SE)

(73) Assignee: OverHorizon (Cyprus) PLC, Nicosia (CY)

(*) Notice: Subject to any disclaimer, the term of this patent is extended or adjusted under 35 U.S.C. 154(b) by 1056 days.

(21) Appl. No.: 11/623,799

(22) Filed: Jan. 17, 2007

(65) Prior Publication Data

US 2007/0178833 A1 Aug. 2, 2007

Related U.S. Application Data

(60) Provisional application No. 60/760,053, filed on Jan. 18, 2006, provisional application No. 60/760,075, filed on Jan. 18, 2006, provisional application No. 60/760,076, filed on Jan. 18, 2006, provisional application No. 60/760,077, filed on Jan. 18, 2006, provisional application No. 60/760,080, filed on Jan. 18, 2006.

(51) Int. Cl.
*H04B 7/185* (2006.01)
(52) U.S. Cl. .................. 455/12.1; 455/427; 370/316
(58) Field of Classification Search ........ 455/12.1–13.3; 370/316
See application file for complete search history.

(56) References Cited

U.S. PATENT DOCUMENTS

| | | | |
|---|---|---|---|
| 4,345,256 A | 8/1982 | Rainwater | |
| 4,599,619 A * | 7/1986 | Keigler et al. | 342/352 |
| 5,343,512 A * | 8/1994 | Wang et al. | 455/410 |
| 5,506,780 A | 4/1996 | Montenbruck et al. | |
| 5,566,354 A | 10/1996 | Sehloemer | |
| 5,625,363 A | 4/1997 | Spilker | |
| 5,736,959 A | 4/1998 | Patterson et al. | |
| 5,765,098 A | 6/1998 | Bella | |
| 5,805,067 A | 9/1998 | Bradley et al. | |
| 5,887,257 A * | 3/1999 | Olds | 455/427 |
| 5,896,558 A | 4/1999 | Wiedman | |
| 5,925,092 A | 7/1999 | Swan et al. | |
| 5,995,841 A | 11/1999 | King et al. | |
| 6,021,309 A | 2/2000 | Sherman et al. | |
| 6,023,606 A | 2/2000 | Monte et al. | |
| 6,032,041 A | 2/2000 | Wainfan et al. | |
| 6,067,442 A | 5/2000 | Wiedeman et al. | |

(Continued)

FOREIGN PATENT DOCUMENTS

DE 41 35 034 4/1995

(Continued)

OTHER PUBLICATIONS

IEEE Transactions on Communications, vol. Com-29, No. 11, Nov. 1981, Ingemarsson et al.*

(Continued)

*Primary Examiner* — Raymond Dean
(74) *Attorney, Agent, or Firm* — White & Case LLP

(57) ABSTRACT

A system of satellite communications provides high throughput data transmission rates for mobile terrestrial terminals. The system may allow point to point communication between two terrestrial terminals. Further, the system may allow point to multipoint communication from an initiating terrestrial terminal to a plurality of target terrestrial terminals. Still further, the system may allow multipoint to multipoint communication from a plurality of initiating terrestrial terminals to a plurality of target terrestrial terminals. The satellites in the system may utilizes on-board functionality such as routing, network management and other data handling functionality. Further, the satellites in the system may communicate amongst each other and route signals through in-box and inter-box communication.

10 Claims, 32 Drawing Sheets

U.S. PATENT DOCUMENTS

| | | | |
|---|---|---|---|
| 6,072,768 | A | 6/2000 | Wiedeman et al. |
| 6,097,957 | A | 8/2000 | Bonta et al. |
| 6,101,385 | A | 8/2000 | Monte et al. |
| 6,125,261 | A | 9/2000 | Anselmo et al. |
| 6,128,487 | A | 10/2000 | Wiedeman |
| 6,147,640 | A | 11/2000 | Wachs |
| 6,160,994 | A | 12/2000 | Wiedeman |
| 6,169,881 | B1 | 1/2001 | Astrom et al. |
| 6,222,499 | B1 | 4/2001 | Goetz et al. |
| 6,236,834 | B1 | 5/2001 | Poskett et al. |
| 6,246,874 | B1 | 6/2001 | Voce |
| 6,272,341 | B1 | 8/2001 | Threadgill et al. |
| 6,275,677 | B1 | 8/2001 | Tandler |
| 6,317,584 | B1 * | 11/2001 | Abu-Amara et al. ........ 455/12.1 |
| 6,324,381 | B1 | 11/2001 | Anselmo et al. |
| 6,339,707 | B1 | 1/2002 | Wainfan et al. |
| 6,430,393 | B1 | 8/2002 | Rosen et al. |
| 6,434,395 | B1 * | 8/2002 | Lubin et al. .................. 455/466 |
| 6,459,898 | B1 | 10/2002 | Yegenoglu et al. |
| 6,463,279 | B1 | 10/2002 | Sherman et al. |
| 6,496,682 | B2 | 12/2002 | Butte et al. |
| 6,538,612 | B1 | 3/2003 | King |
| 6,553,226 | B1 * | 4/2003 | Watson .......................... 455/428 |
| 6,570,859 | B1 | 5/2003 | Cable et al. |
| 6,574,794 | B1 | 6/2003 | Sarraf |
| 6,594,469 | B1 | 7/2003 | Serri et al. |
| 6,594,706 | B1 | 7/2003 | DeCoursey et al. |
| 6,704,543 | B1 | 3/2004 | Sharon et al. |
| 6,708,029 | B2 | 3/2004 | Wesel |
| 6,735,440 | B2 | 5/2004 | Wiedeman et al. |
| 6,804,514 | B2 | 10/2004 | Wiedeman et al. |
| 6,825,806 | B2 * | 11/2004 | Liu et al. ....................... 342/359 |
| 6,879,829 | B2 | 4/2005 | Dutta et al. |
| 6,954,613 | B1 | 10/2005 | Castiel et al. |
| 6,957,080 | B2 | 10/2005 | Guetre et al. |
| 7,010,306 | B1 * | 3/2006 | Tanibayashi et al. ....... 455/456.1 |
| 7,065,355 | B2 * | 6/2006 | Spio ............................... 455/428 |
| 7,146,191 | B2 * | 12/2006 | Kerner et al. .................. 455/558 |
| 7,257,611 | B1 * | 8/2007 | Shankar et al. ............... 709/201 |
| 2001/0045494 | A1 | 11/2001 | Higgins |
| 2002/0058478 | A1 | 5/2002 | De La Chapelle et al. |
| 2003/0007465 | A1 | 1/2003 | Artzi |
| 2003/0017803 | A1 | 1/2003 | Rubin et al. |
| 2003/0054760 | A1 | 3/2003 | Karabinis |
| 2003/0112124 | A1 | 6/2003 | Gudmundsson |
| 2003/0207684 | A1 | 11/2003 | Wesel |
| 2004/0038644 | A1 | 2/2004 | Jimenez et al. |
| 2004/0157554 | A1 | 8/2004 | Wesel |
| 2004/0203444 | A1 | 10/2004 | Jarett |
| 2005/0030932 | A1 * | 2/2005 | Kelly et al. .................... 370/345 |
| 2005/0032531 | A1 | 2/2005 | Gong et al. |
| 2005/0053026 | A1 | 3/2005 | Mullan et al. |
| 2005/0076394 | A1 | 4/2005 | Watson et al. |
| 2005/0085186 | A1 | 4/2005 | Sandrin |
| 2005/0197060 | A1 | 9/2005 | Hedinger et al. |
| 2005/0250542 | A1 | 11/2005 | Aoyama et al. |
| 2006/0023648 | A1 | 2/2006 | Amos |
| 2006/0025073 | A1 | 2/2006 | Benco et al. |
| 2007/0011465 | A1 * | 1/2007 | Webber et al. ................ 713/186 |
| 2007/0167132 | A1 | 7/2007 | Wahlberg et al. |
| 2007/0168675 | A1 | 7/2007 | Wahlberg et al. |
| 2007/0178833 | A1 | 8/2007 | Wahlberg et al. |
| 2007/0178834 | A1 | 8/2007 | Wahlberg et al. |
| 2008/0045146 | A1 | 2/2008 | Wahlberg et al. |
| 2009/0021424 | A1 | 1/2009 | Wahlberg et al. |
| 2009/0022088 | A1 | 1/2009 | Wahlberg et al. |

FOREIGN PATENT DOCUMENTS

| | | |
|---|---|---|
| EP | 820208 A2 * | 1/1998 |
| EP | 0 858 176 | 8/1998 |
| EP | 915529 | 5/1999 |
| EP | 1 065 806 | 1/2001 |
| EP | 1 117 198 | 7/2001 |
| EP | 1 223 691 | 7/2002 |
| EP | 1 014 598 | 10/2004 |
| GB | 2 313 743 | 12/1997 |
| GB | 2 341 762 | 3/2000 |
| JP | 62-084604 | 4/1987 |
| JP | 09-153718 | 6/1997 |
| JP | 10-178313 | 6/1998 |
| JP | 2001-007637 | 1/2001 |
| WO | WO96/31016 | 10/1996 |
| WO | WO97/25785 | 7/1997 |
| WO | WO98/20634 | 5/1998 |
| WO | WO00/28678 | 5/2000 |
| WO | WO-01/26251 | 4/2001 |
| WO | WO01/37588 | 5/2001 |
| WO | WO02/27975 | 4/2002 |
| WO | WO02/27976 | 4/2002 |
| WO | WO-03/026328 | 3/2003 |
| WO | WO-2005/093967 | 10/2005 |
| WO | WO-2007/000794 | 1/2007 |
| WO | WO-2007/064094 | 6/2007 |
| WO | WO-2007/067016 | 6/2007 |
| WO | WO-2007/082719 | 7/2007 |
| WO | WO-2007/082720 | 7/2007 |
| WO | WO-2007/082721 | 7/2007 |
| WO | WO-2007/082722 | 7/2007 |
| WO | WO-2007/090506 | 8/2007 |
| WO | WO-2009/010253 | 1/2009 |
| WO | WO-2009/010254 | 1/2009 |
| WO | WO-2009/039998 | 4/2009 |

OTHER PUBLICATIONS

Robert A. Nelson, *Antennas: The Interface with Space*, Via Satellite, dated Sep. 1999.

Maryann Lawlor, *Network-Centric Operations Go on the Road*, Signal, dated Oct. 2005.

Phil Hochmuth, *Cisco in Space*, Network World, dated Oct. 31, 2005.

Bell, K. D. et al: "Balancing Performance and Cost for Cost-Effective Satellite Systems Design Using an Integrated Cost Engineering Model," Aerospace Applications Conference, 1995. Proceedings., 1995 IEEE Aspen Co., pp. 153-167.

Gordon, Morgan: "Principles of Communications Satellites" 1993.

Maryann Lawlor, Network-Centric Operations Go on the Road, Signal, Oct. 2005.

Phil Hochmuth, Cisco in Space, Network World, Oct. 31, 2005.

Rainger et al: "Satellite Broadcasting," 1985, pp. 267-279.

Robert A. Nelson, Antennas: The Interface with Space, Via Satellite, Sep. 1999.

International Search Report issued in International Patent Application No. PCT/EP07/000364.

Written Opinion issued in International Patent Application No. PCT/EP07/000364.

International Search Report issued in International Patent Application No. PCT/EP2008/005723.

Written Opinion issued in International Patent Application No. PCT/EP2008/005723.

Invitation to Pay Additional Fees and partial international search results issued in International Patent Application No. PCT/EP2008/007548.

Written Opinion issued in International Patent Application No. PCT/EP2008/007548.

International Search Report and Written Opinion issued in International Patent Application No. PCT/EP07/000365.

International Search Report and Written Opinion issued in International Patent Application No. PCT/EP07/000363.

International Search Report and Written Opinion issued in International Patent Application No. PCT/EP07/000362.

Rainger et al: "Satellite. Broadcasting," 1985, pp. 267-279.

International Search Report issued in International Patent Application No. PCT/EP07/000361.

Written Opinion of the International Search Authority issued in International Patent Application No. PCT/EP07/000361.

* cited by examiner

SYSTEMS AND METHODS FOR SATELLITE COMMUNICATIONS WITH MOBILE TERRESTRIAL TERMINALS

CROSS-REFERENCES TO RELATED APPLICATIONS

The present application claims the benefit under 35 U.S.C. §119(e) of the priority filing dates of provisional patent application Ser. Nos. 60/760,053, 60/760,075, 60/760,076, 60/760,077, and 60/760,080, all filed on Jan. 18, 2006. The disclosures of all above-referenced applications are incorporated by reference herein in their entirety.

FIELD OF THE INVENTION

This invention relates to systems and methods for satellite communications.

BACKGROUND OF THE INVENTION

The ability to communicate via satellite while in motion, though long desirable, has been an elusive goal. While some mobile satellite communication capability has been developed, such as the INMARSAT, Iridium, Teledesic and other systems, these are directed to low bandwidth communications that have generally been limited to certain types of emergency signaling (in the case of INMARSAT) or voice, in the case of Iridium, Teledesic and the like. Higher bandwidth communications, particularly of the type to support the sort of broadband data transmission that most computer users have grown accustomed to over the past decade, have proved even more elusive for those wishing to access this ability from a mobile platform. The capability to have high bandwidth data transmission not only where one wishes, but also when, has been complicated by the fact that most or all of the high throughput satellite communications systems require a great deal of lead time as a precondition to invoking them. Typically, one is required to communicate with a satellite communications ("satcom") service provider many hours or even days in advance in order to permit the provider to make the necessary resource allocation arrangements.

This constrained state of affairs, and the various technical, economic and organizational factors that have produced it, have conspired to keep high bandwidth mobile satcom from being realized, despite a vast potential demand for it.

Other factors are also relevant when considering the design of effective satcom systems. Communications satellite systems have been configured in a variety of ways, each with its own level of complexity, and each having respective advantages and disadvantages. One method for conducting satellite communications is sometimes referred to as the "bent-pipe" method, in which a signal is sent from a fixed point on Earth, received by the satellite and amplified, then sent back down to a predetermined receiver. Decisions about routing and switching of communications traffic, essential to communications systems in general, are made on the ground, as is the execution of those decisions. Because the satellites used in carrying out the bent-pipe method lack on-board communications traffic processing, the method is typically limited to use within a single satellite communications beam.

Another method for satellite communication is the "hub" configuration. In this configuration, a series of terrestrial terminals and a single hub are located within a single beam. The hub acts as a two-step bent-pipe configuration, in which the uplink signal is routed from the satellite, which may be a geosynchronously orbiting (GEO) satellite, to an intermediate ground hub. The hub acts as a local control center to assign channels and other functions associated with the network management.

Conventional satellite communications systems, which may be referred to below as SATCOM systems, when using satellite in GEO orbits, have typically provided two types of services: a relay mode and a broadcast mode. In the relay mode, the GEO satellite relays a signal from one terrestrial terminal to another. When in the broadcast mode, the GEO satellite transmits a signal to a large number of terrestrial terminals. In the relay mode, which corresponds to the bent-pipe discussed above, a terrestrial terminal transmits a signal using an uplink frequency to the GEO satellite, which retransmits the signal to a second terrestrial terminal using a downlink frequency. When the transmission footprint of the GEO satellite on the earth's surface is large, the power density of the signal is correspondingly low. A signal having low power density demands that the receiving antenna be sufficiently large to achieve the requisite antenna gain to put the low density signal to use. Alternatively, use of smaller antennas requires the satellite to generate sufficient radiated power to supply a power density within the single wide area coverage beam sufficient for signal reception and usage by the smaller antennas.

Communications satellite system architectures for smaller antennas have involved a number of smaller spot beams, instead of a single wide area coverage beam, to cover the same geographical area. By decreasing the size of the spot beams while maintaining the same overall transmitted power, the power density within each spot beam enables the use of smaller terrestrial antennas.

Existing satellite communications systems use common Ku-band uplink and Ku-band downlink frequencies that are extensively populated and re-used. Furthermore, in existing satellite communications systems the satellites are closely spaced. This close spacing increases the likelihood of interference between their respective communications links and the need to reuse frequencies. Furthermore, closely spaced satellites using the Ku-band require terrestrial terminals to use a narrow beam, which in turn requires larger antennas and more accurate pointing systems. As a result, terrestrial terminals become larger and more expensive, while providing a lower throughput than may be desirable.

Some existing satellite communication systems may use a steerable spot beam, a satellite signal that is specially concentrated in power so that it will cover only a regional geographical area and the direction of which can be controlled. Because these beams have a smaller, more regional footprint than do wide area beams, they are not easily adapted to terrestrial terminals that are on-the-move.

SUMMARY OF THE INVENTION

Mobile satellite communications having data throughput greater than required to permit voice communications, and in particular broadband-scale data throughput, are provided according to various aspects of the present invention.

In an embodiment of one aspect of the present invention, a satellite communications network utilizes a satellite-based hub with regenerative payload, reducing not only required antenna size at origination or receipt, but also cutting transmission delay in half. In a multiple satellite space segment, the hub functionality may be spread amongst all the space segment assets. Further, satellites in the network utilize on-board processing, which drastictally improves linkbudget, in particular for systems communicating with lowlink margins such as small antenna systems. Still further, satellites specifically balance the power and multiplexing into one major downlink, which makes effective use of the available power and balanced coverage realtive to the power densities needed for mobile terrestrial terminals.

In an embodiment of one aspect of the present invention, a satellite communications network utilizes coordination between the satellites to reduce levels of interference, dictated by physical limitations of small antennas.

In another aspect, the present invention provides systems and methods for permitting data communications between a mobile terrestrial platform and a satellite (and then to another recipient) with data throughput rates exceeding 500 kbps.

In an embodiment of yet another aspect of the present invention, terrestrial terminal size, including antenna size, is kept to a minimum as a function of a variety of architectural and platform considerations. This minimal antenna and terrestrial terminal size and weight facilitate greater mobility. Moreover, these minimally sized terminals tend to be less expensive, permitting greater usage throughout an organization. This more widely distributed usage, in turn, tends to make systems that employ one or more aspects of the present invention more secure: with a much higher number of terminals, each benefits from a "safety-in-numbers" strategy. Still further, their reduced size permits antennas and perhaps other aspects of the terrestrial platforms to be more effectively concealed from attack, either by being incorporated into existing or otherwise inconspicuous features of a vehicle, or even into a helmet or other wearable piece of equipment or clothing of one of the users of the mobile system. Still further, their reduced size simplifies installation, integration and transportation of the terrestrial terminals.

Terrestrial terminals, and the antennas that work with them, may, in an embodiment of an aspect of the present invention, be less than or equal to about 50 cm in a major dimension, a feature that may be permitted by other aspects of the present invention, which may include but are not limited to the on-board data handling (OBDH) of the satellite components, and a resultant, low-profile physical aspect (e.g., partially built into roof of vehicle or into other existing object, even conformal antenna in personnel helmet or other worn or carried device, which go down to about 10 cm in diameter) permitting reduction in security risk.

Still other aspects of the present invention include methods of fleet or force communications and management that are made possible by the small, inexpensive, high throughput, and easily accessed mobile satellite communications that can be made possible by the various aspects of the present invention. These methods, in one embodiment, comprise the steps of providing a plurality of mobile platforms and providing, for each mobile platform, a satellite telecommunications terminal capable of mobile high bandwidth communications via satellite with the other mobile platforms and capable of being invoked for such communication in real or near-real time.

A related method comprises the steps of increasing security of communications of a force comprising distributed mobile elements comprising the steps of providing, for each of the mobile elements, a mobile satellite terminal for accessing a data communications channel, and further providing a space-based hub through which the mobile terminals communicate, thereby providing reduced accessibility of critical communications facilities to security risks.

In an embodiment of another aspect of the present invention, a space-based hub with regenerative payload on each satellite in the space segment for use in "one-hop" communications reduces not only required antenna size at originating or receipt, but also cuts transmission delay in half. As a related point, "network symmetry" permitted by a one-hop approach, makes manufacturing and management of terrestrial terminals simpler and cheaper (predictability of terminal size, economies of scale in production, etc.).

Yet another aspect of the present invention includes a method for transmitting a data stream from a first mobile terrestrial terminal (or a plurality of terrestrial terminals) to a second terrestrial terminal (or plurality of terrestrial terminals) comprising transmitting data to a satellite, the data accompanied by address information of a second mobile terrestrial terminal, where the satellite has on-board data handling and based on an address (and optionally on known position information of a second mobile terminal) from a routing table determines a beam appropriate for a second mobile terminal and transmits to that mobile terminal. That transmission can, but need not, be in a bulk transmission that includes data for multiple terrestrial terminals, such that a destination terrestrial terminal retrieves message(s) addressed to it.

BRIEF DESCRIPTION OF THE DRAWINGS

The various aspects of the systems and methods according to the present invention are described in the figures identified below and in the detailed description that follows.

DETAILED DESCRIPTION

Figure 1:
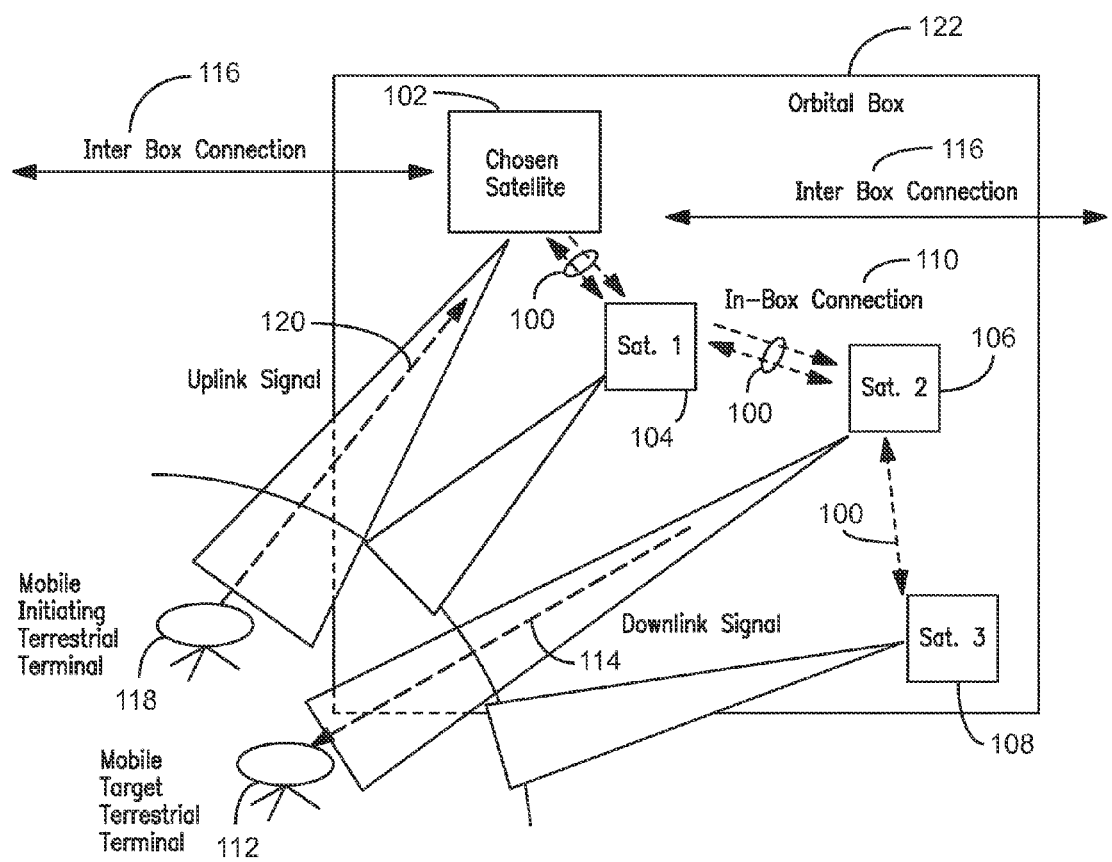
FIG. 1 shows a high level view of an embodiment of a system and method, according to the present invention, for providing satellite communications.

This description, including the figures, describes embodiments that illustrate various aspects of the present invention. These embodiments are not intended to, and do not, limit the scope of the invention to particular details.

The various entities identified in the Figures and described herein may each utilize one or more computer processors, and the computer processors of each entity may be configured to communicate with the computer processors of one or more of the other entities in order to carry out the methods of the present invention.

The present invention, in one embodiment, provides a system and method for creating a scalable satellite communications network installation to allow incremental and scalable buildup of capacity and to reduce risk and the reduce time for achieving a return on investment in the network.

In an embodiment of one aspect of the present invention, communications satellites of reduced size and mass are provided. In particular, the systems and methods according to the present invention permit the fabrication of communications satellites having mass of 800 kg or less. To reduce the size and weight of the satellite, in one embodiment, a new propulsion system for slow transit orbit may be utilized.

Small satellites according to the present invention in turn make possible previously unrealizable and even unrecognized flexible service solutions for customers.

Moreover, satellites in this size range have a short design cycle and provide a short commission-to-service time. Communications satellites having these features provide, according to another aspect of the present invention, an improved ability to provide a satellite communication network that uses current rather than aged technology. More rapid access to the latest technology on-orbit also allows optimization of the satellite links to further drive ground system efficiency up and therefore reduce system size and cost.

Small communications satellites according to the present invention reduce the amount of investment needed to provide capacity on orbit as compared to larger satellites. Therefore, this increases the modularity and flexibility of the system. The use of low-cost satellites with less bandwidth on-board enables customized solutions for each satellite payload concentrating on particular parts of a frequency use spectrum and thereby may avoid local interference issues. This may enable the satellite communications operator to ensure that service does not interfere with other users and thereby may avoid regulatory approvals and coordination.

As shown in FIGS. 1, 2, 3, 4, and 5, the satellite 200 is provided, according to an aspect of the present invention, with certain on-board processing capabilities 202. In one embodiment, the satellite comprises one software engine 204 to perform all on-board processing functions 202. In another embodiment, the on-board processing functionality 202 is divided among multiple software engines 400. Examples of the types of software engines include an authentication engine 402, a routing engine 404, a network management engine 406, a command management engine 408, baseband processing modules 410, payload operations processes 412, network management processes 414 and spacecraft operations processes 416. These software engines may employ one or a plurality of databases 206. The satellite 200 is provided with hardware components 500, described in greater detail below, to communicate with earth segment terrestrial terminals 208, 210, 212 as well as perform other functionality, such as routing to other satellites in the network 100, 300. An example of the types of hardware components include an antenna(s) 502, router(s) 302, 504, multiplexor(s) 304, 506, demodulator(s) 510, modulator(s) 512 and xDMA 508 (Division Multiple Access in which 'x' can be "code", "frequency", "time" or any combination thereof).

Figure 31:
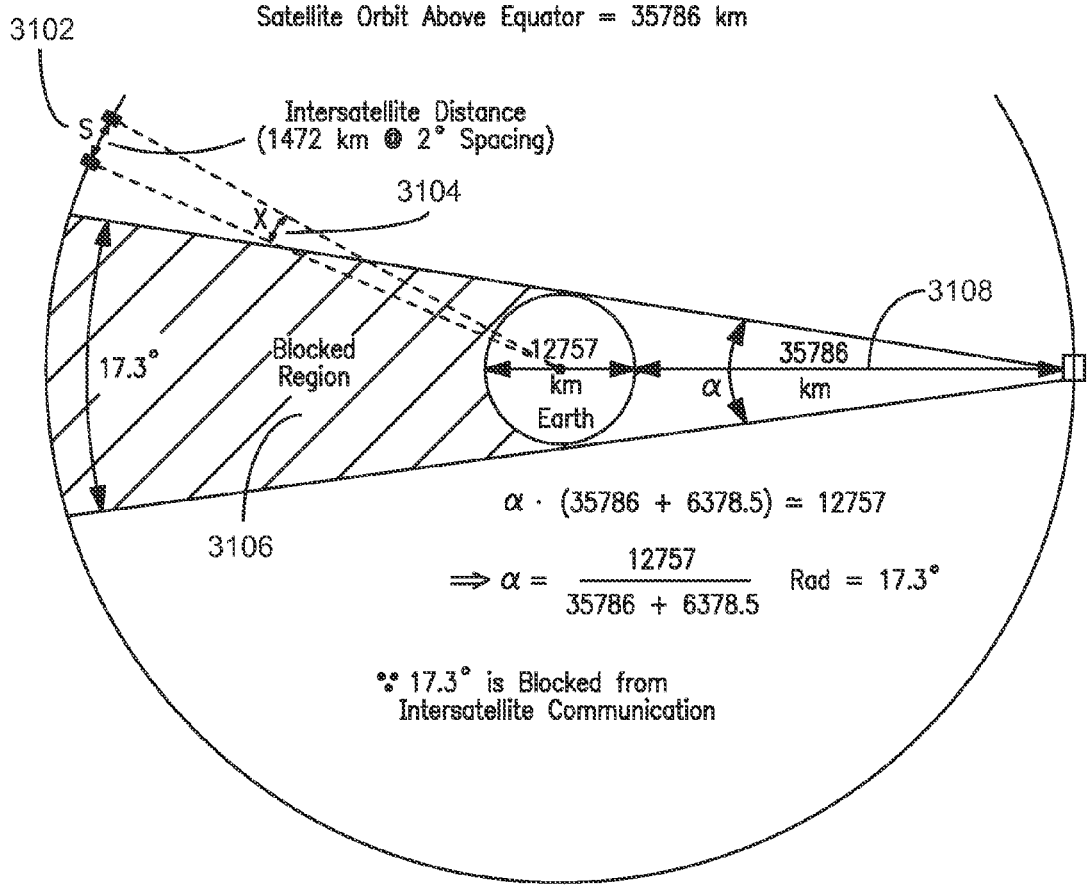
FIG. 31 shows a view of intersatellite communication geometry.

Referring to FIG. 1, satellite constellations according to the present invention can be both modular and flexible. In one embodiment of such a constellation, multiple satellites 102, 104, 106, 108 are placed in a single orbital slot and/or in separate orbital slots, and can be inserted into the slots of one or more at a time, with a capability to provide communications services beginning with the first insertion. The satellites can be equipped to manage changes in capacity and interferences through "in-box" communication and routing 110, i.e. communication and routing between satellites in the same orbital slot. FIG. 31 provides an illustration of the general size of the box 3100 relative to other sample satellite orbit parameters. Furthermore, according to an aspect of the present invention, the satellites in the same orbital position can increase the strength of the footprint coverage over one area as user needs change over time. Using multiple satellites covering different geographical regions/parts may enable a system to switch coverage to a new satellite covering a different region via communication between the satellites when the terrestrial terminal moves outside the first satellite coverage. Additionally, the satellites may be distributed over differing orbital slots to provide footprint coverage over respective areas of the earth. Satellites in constellation that can communicate between each other may be used, in one embodiment, as a mono pulse tracking system. In one embodiment, the satellites are placed in geostationary orbit. In an alternate embodiment, the satellites are placed in geosynchronous orbit. In still another, the satellites are placed in Molniya orbits. In yet another alternate embodiment, the satellites are placed in low earth orbit or mid-earth orbit. Other orbital configurations of satellite architectures of the present invention are also possible.

An example of intersatellite communication geometry for satellites in geostationary orbit is illustrated in FIG. 31. In this embodiment, the intersatellite distance between satellites 3102 is calculated for a given angle of separation 3104 from the Earth center. Also, there will always be a blocked region 3106 precluding intersatellite communication that can be calculated given a satellite's orbital distance above the equator 3108.

A communications satellite network architecture embodying an additional aspect of the present invention provides systems and methods for intelligent routing capabilities for use in managing the inventive modular and flexible approach to satellite communications. In one embodiment, a system according to the present invention utilizes a network status channel to manage updates to the network. Network management functionality may be spread among all satellites in the network. In this embodiment, it is possible to spread network management functionality to terrestrial terminals as well. Specifically, each satellite in the system monitors network status information such as jamming, rain fades, the addition of extra satellites, ECM information, asset management, etc. In one embodiment of one aspect of the present invention, when a satellite receives network status information, the information is routed to all other satellites in the network. The network status information may be sent to all terrestrial terminals within the satellite's footprint coverage.

Figure 2:
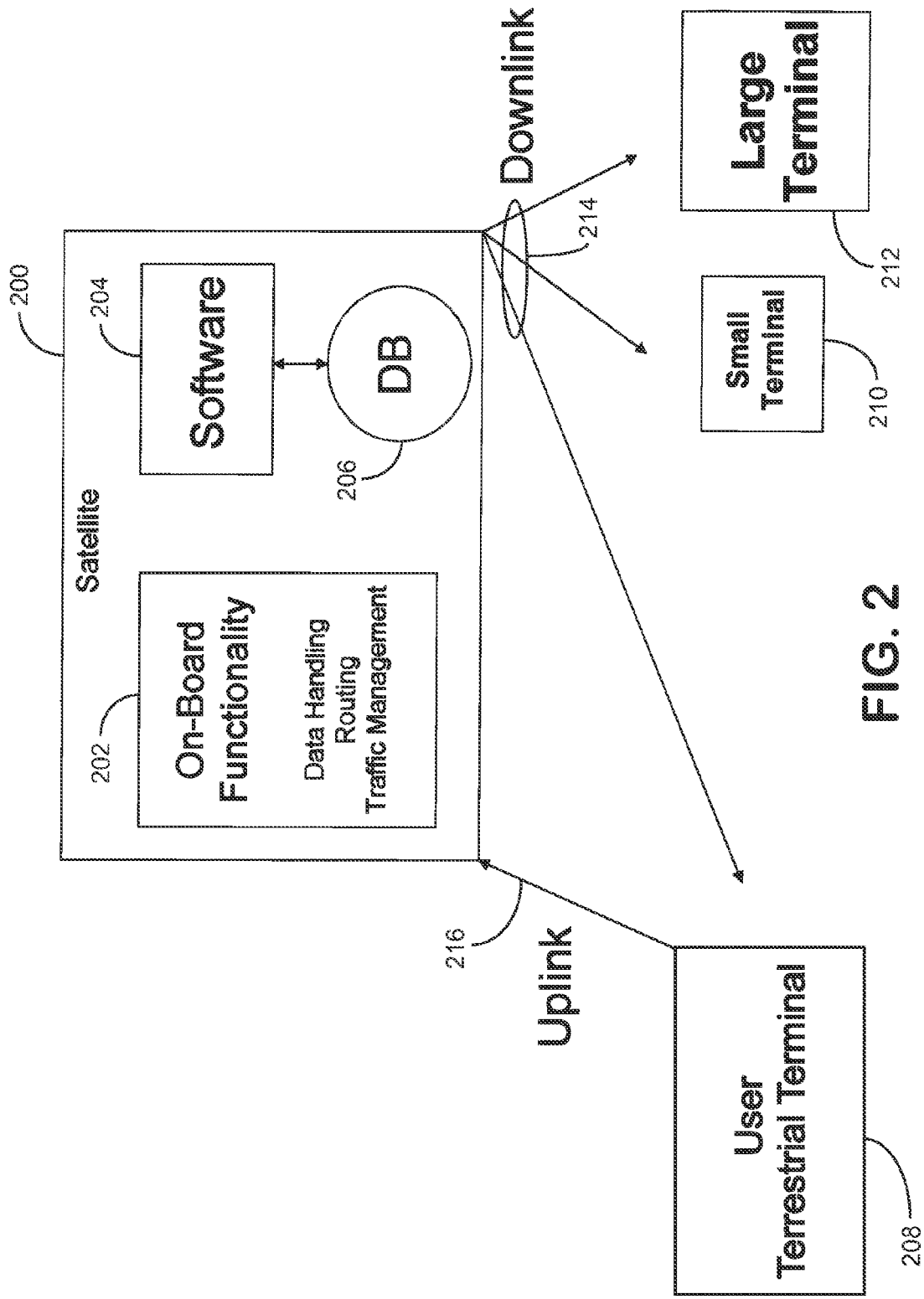
FIG. 2 shows a high level view of an embodiment of a system and method, according to the present invention, for providing satellite communications.
Figure 3:
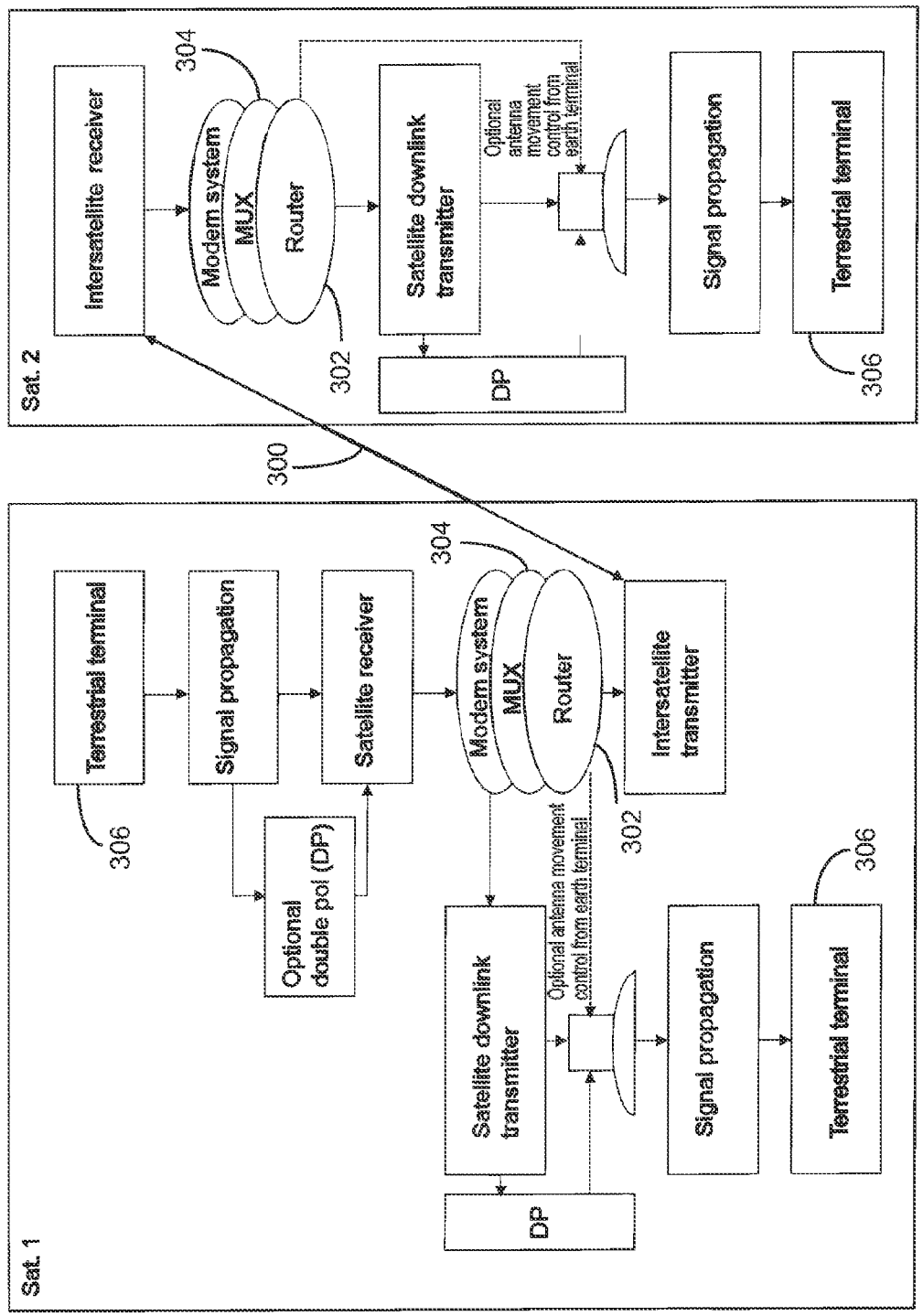
FIG. 3 shows a high-level schematic view of the architecture in an embodiment of a system and method according to the present invention, with an emphasis on the satellite side of the system.

Referring to FIGS. 1, 2 and 3, in one embodiment, the information is sent to the terrestrial terminals 112, 208, 210, 212, 306 via a downlink broadcast 114, 214. These network status updates provide parameters to dynamically reconfigure the network to manage changing conditions and coverage requirements. Furthermore, by maintaining a network status channel among all satellites in the network, the system is able to intelligently route communication signals and other signals. Still further, as illustrated in FIG. 30B, the network status channel allows the system to adjust to failure of one satellite by dynamically routing a signal to an alternate satellite in the satellite network 3050. In another embodiment, the network status information is used to allow users to manually specify a route for a signal.

An embodiment of a system and method according to the present invention involves building a modular and flexible satellite communications network.

In one embodiment of one aspect of the present invention, the satellite operator offers a set of parameters and values for the parameters that constitutes a design space for a customer to make a choice. In one embodiment, the parameters are satellite size, lifetime and payload. A customer, subject to the constraints of the parameters offered by the satellite operator, drives the development of a satellite system of the satellite operator through its specifications. The customer specifications, in one embodiment, comprise bandwidth, security, antenna control, satellite control and footprint specifications. Based on these customer specifications, the satellite operator derives solutions for the customer by building, expanding and enhancing a satellite communications system within the design space. These solutions may be economically driven, technologically driven, and/or performance driven solutions.

Figure 21:
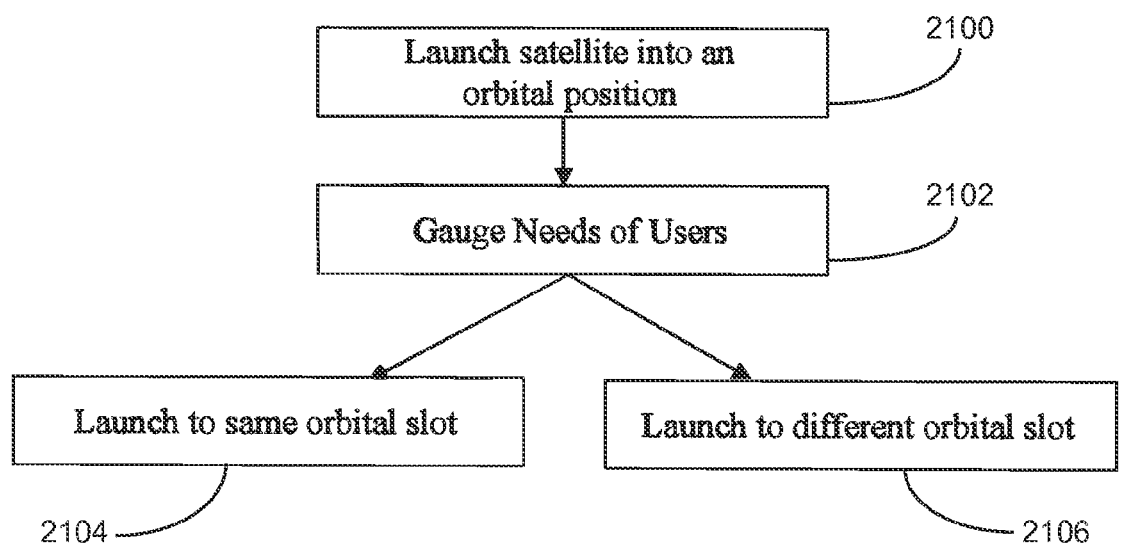
FIG. 21 shows, in flowchart form, steps associated with an embodiment of a method, according to the present invention, for building, expanding or enhancing a satellite communications system.

As shown in FIG. 21, various aspects of the present invention can be best understood in the context of satellite launch and placement decision-making and implementation. A first step in the installation of a satellite communications network is the launching of a satellite into an orbital position 2100. After the first satellite, having certain communications capabilities is installed in the network, the supplier of the satellite communications service, employing a modular approach according to the present invention, can gauge the needs of the users 2102 of the satellite communications network before expanding the network. Based on user need, the supplier of the satellite communications service may decide to launch a second satellite into the network 2104, 2106. At their juncture, the supplier has two options as to where the satellite is launched in the network: First, the satellite can be launched into the same orbital slot as the first satellite 2104, whereby the satellites would interact through in-box communication 110; second, the satellite can be launched in a different orbital slot from the first satellite 2106, so that the satellites would interact through inter-box communication 116.

As the needs of the users expand, the supplier is able to respond, as rapidly as demand requires through launching new and replacement satellites into the network, in accordance with this aspect of the present invention. These satellites can be equipped with the latest changes in technology. The supplier has the ability to place new satellites into the network to provide a network topology that best suits the users' needs, rather than being tied to a large satellite system that is inflexible to change. As the network expands through subsequent launches of new and replacement satellites, there is no need for a "double hop" in communication, i.e. the need to send signals from two points on the Earth's surface that cannot be viewed by the same satellite in GEO via an intermediate ground station. Also, the satellite communications network can rapidly respond to satellite failure in the network due to the use of small satellites and the rapid commission to service times.

In an embodiment of another aspect of the present invention, the system employs a physical space segment architecture allowing reconfigurable capacity. The system enables spatial redundancy in any orbital slot and incrementally increased capacity in any orbital slot through the collocation of satellites in close proximity to one another. In yet another embodiment, inter-satellite links and inter-orbit links increase network physical layer routing and flexibility.

Figure 22:
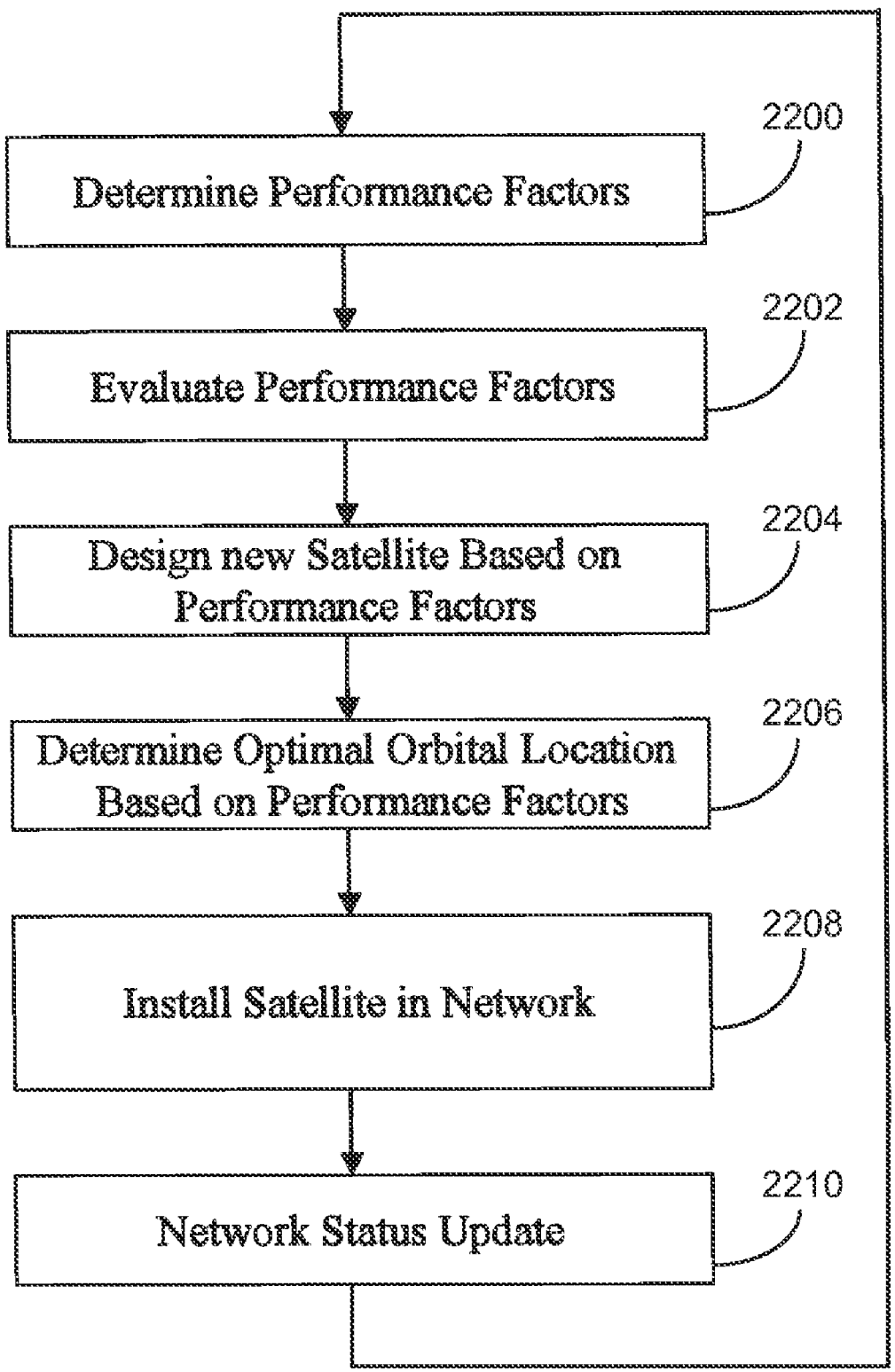
FIG. 22 shows, in flowchart form, steps associated with an embodiment of a method, according to the present invention, for building, expanding or enhancing a satellite communications system.

Referring to FIG. 22, an embodiment of another aspect of the present invention involves satellite launch and placement decision-making and implementation. In this embodiment, various performance factors for the network are first arrived at 2200. Without limitation, these performance factors can include footprint coverage, satellite constellation topology, bandwidth, capacity and number of users per satellite. These factors are then evaluated by the system 2202. Software engine(s) 204, 400 in the individual satellites may monitor and evaluate these performance factors 2202. These performance factors and their evaluations 2202 are then used to develop and design a new satellite for the network 2204. In one embodiment, these performance factors and their evaluations 2202 are used to determine the optimal location of the new satellite 2206. Next, the satellite is installed into the network 2208 through a launch into a pre-assigned orbital position. Finally, the satellites take into account the new satellite in the network through network status updates 2210.

In another of its aspects, the present invention provides for mobile terrestrial satellite communication having high bandwidth. The term "high bandwidth," as used herein, refers, without limitation, to bandwidth that exceeds the bandwidth needed to transmit 500 kbps or greater.

In an embodiment of one aspect of the present invention, a satellite communications system includes three primary components. A first component of the system comprises an initiating terrestrial terminal 118. As used herein, terrestrial refers to terminals that are non-spaced-based. They may be on actual terra firma, but may also be in sea- or air-borne platforms. In an alternate embodiment of this aspect of the present invention, the first component of the system comprises a group of terrestrial terminals.

Figure 6:
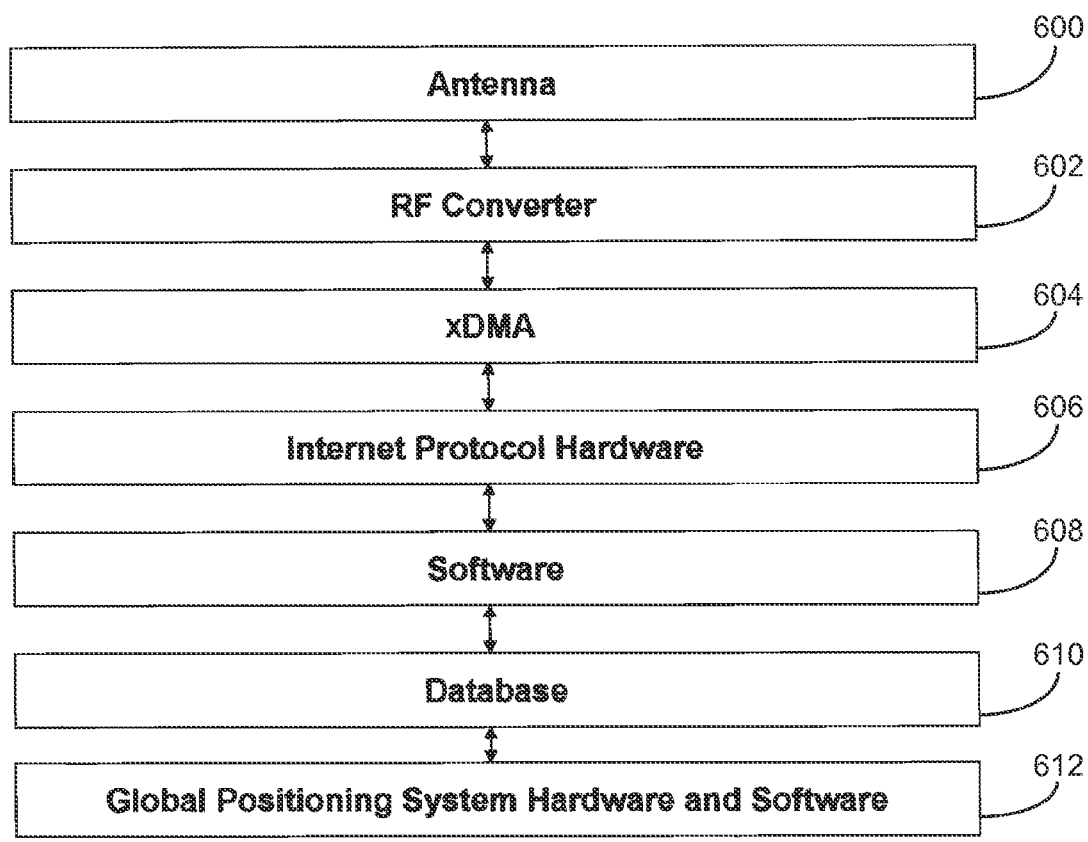
FIG. 6 shows a high-level view of the architecture of a terrestrial terminal in an embodiment of a system and method according to the present invention.
Figure 7:
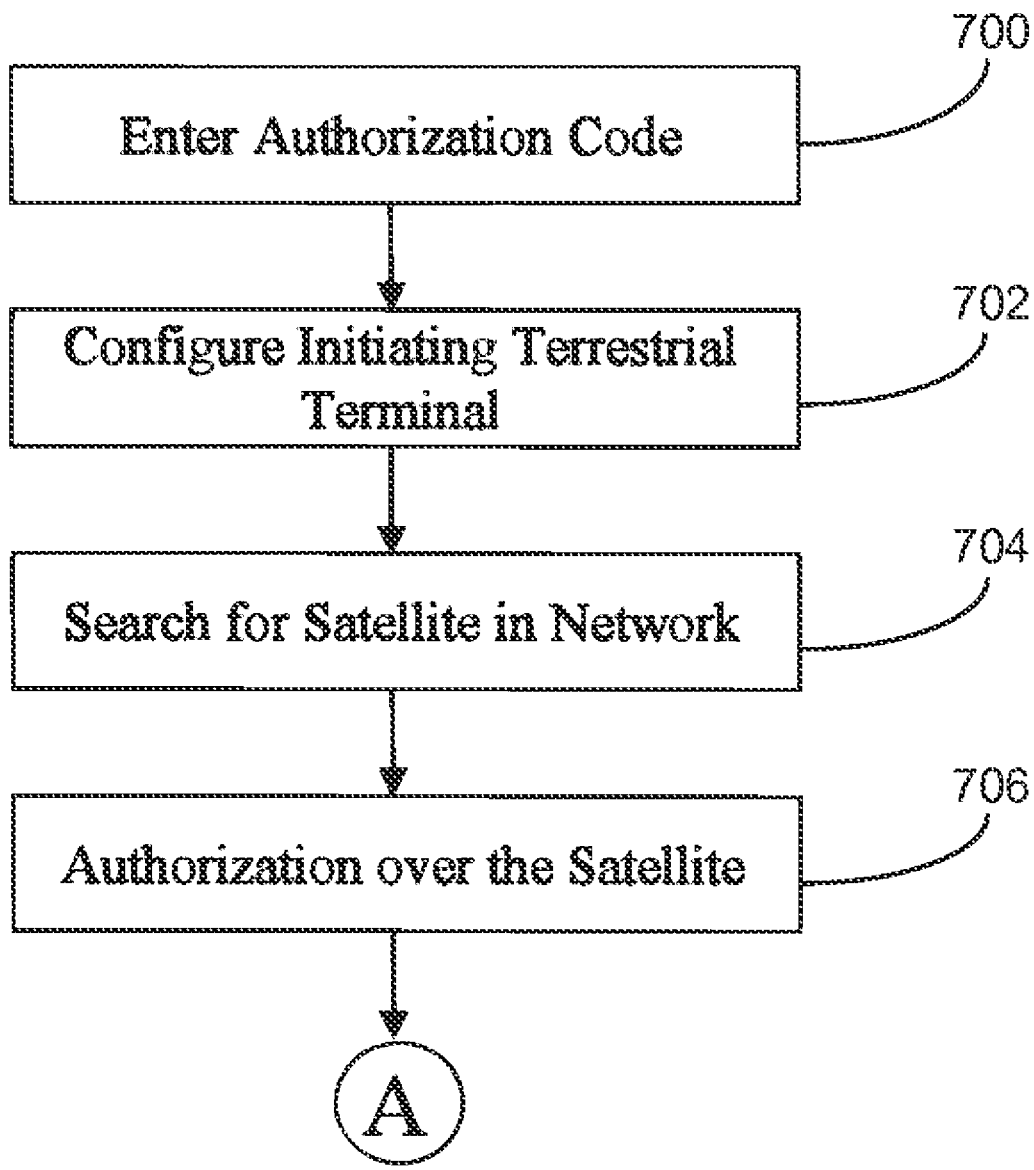
FIGS. 7-20 show, in flowchart form, steps associated with an embodiment of a method, according to the present invention, for providing satellite communications service to a customer.
Figure 8:
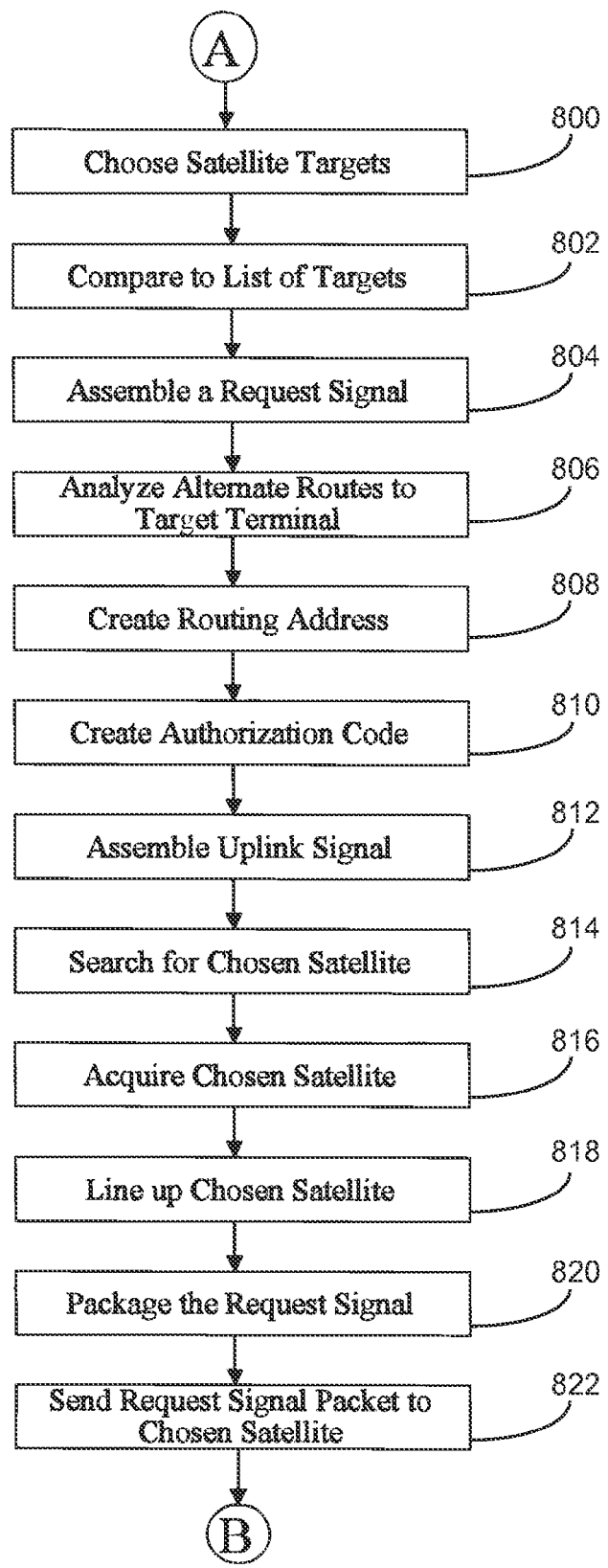
Figure 9:
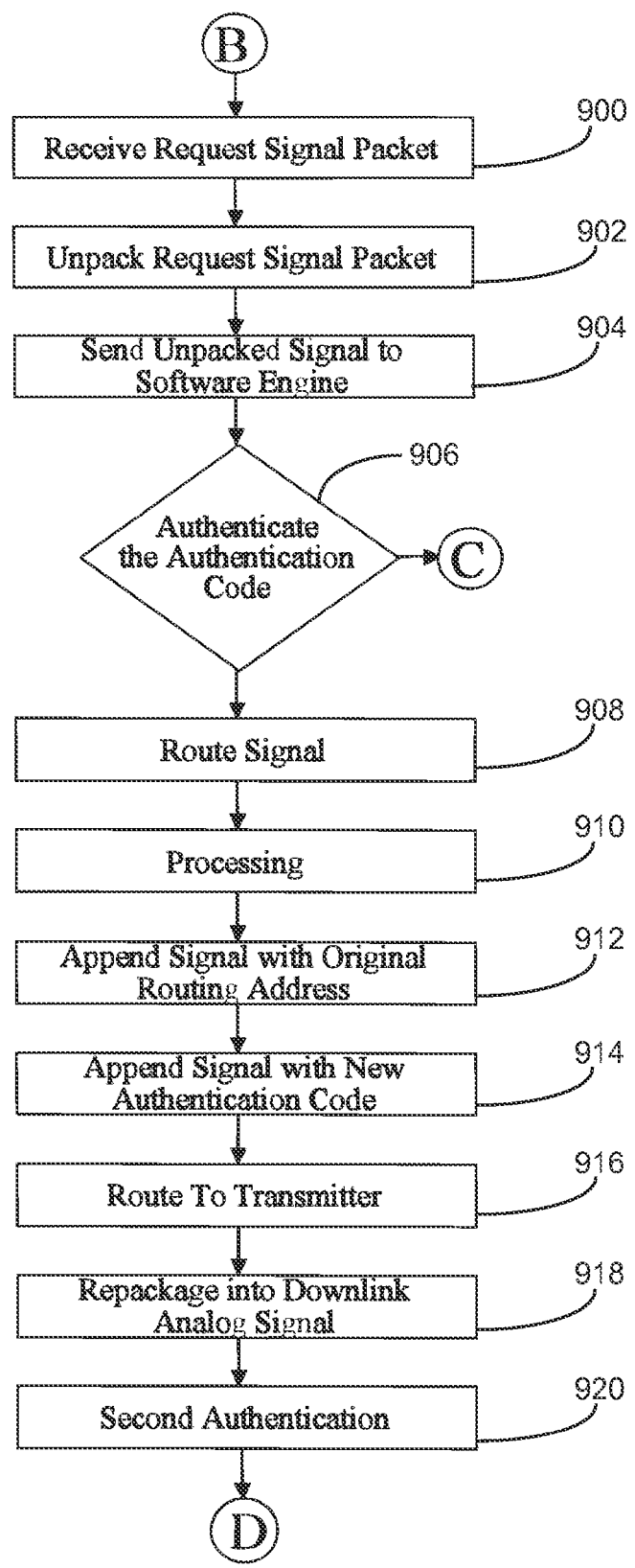
Figure 10:
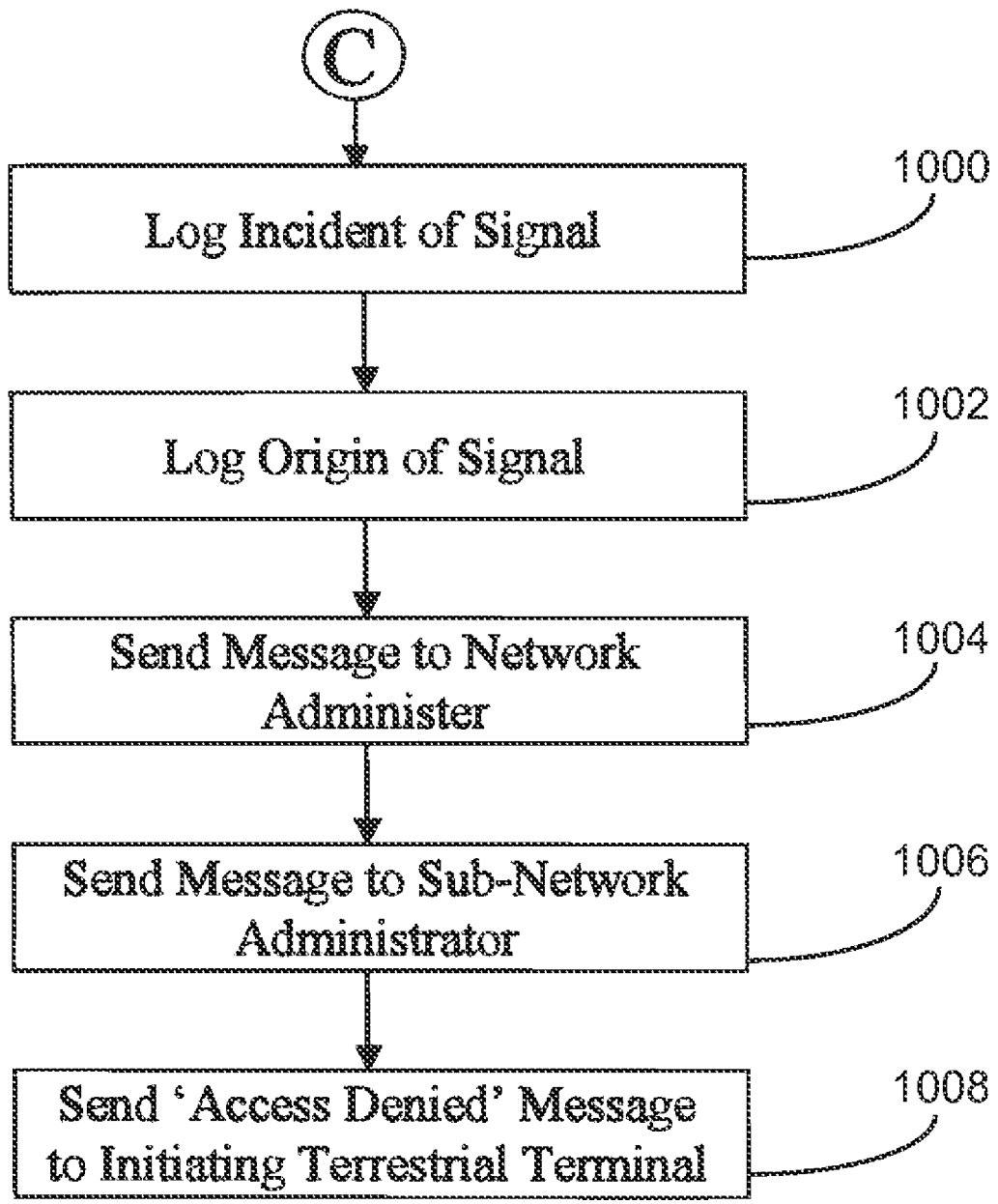
Figure 11:
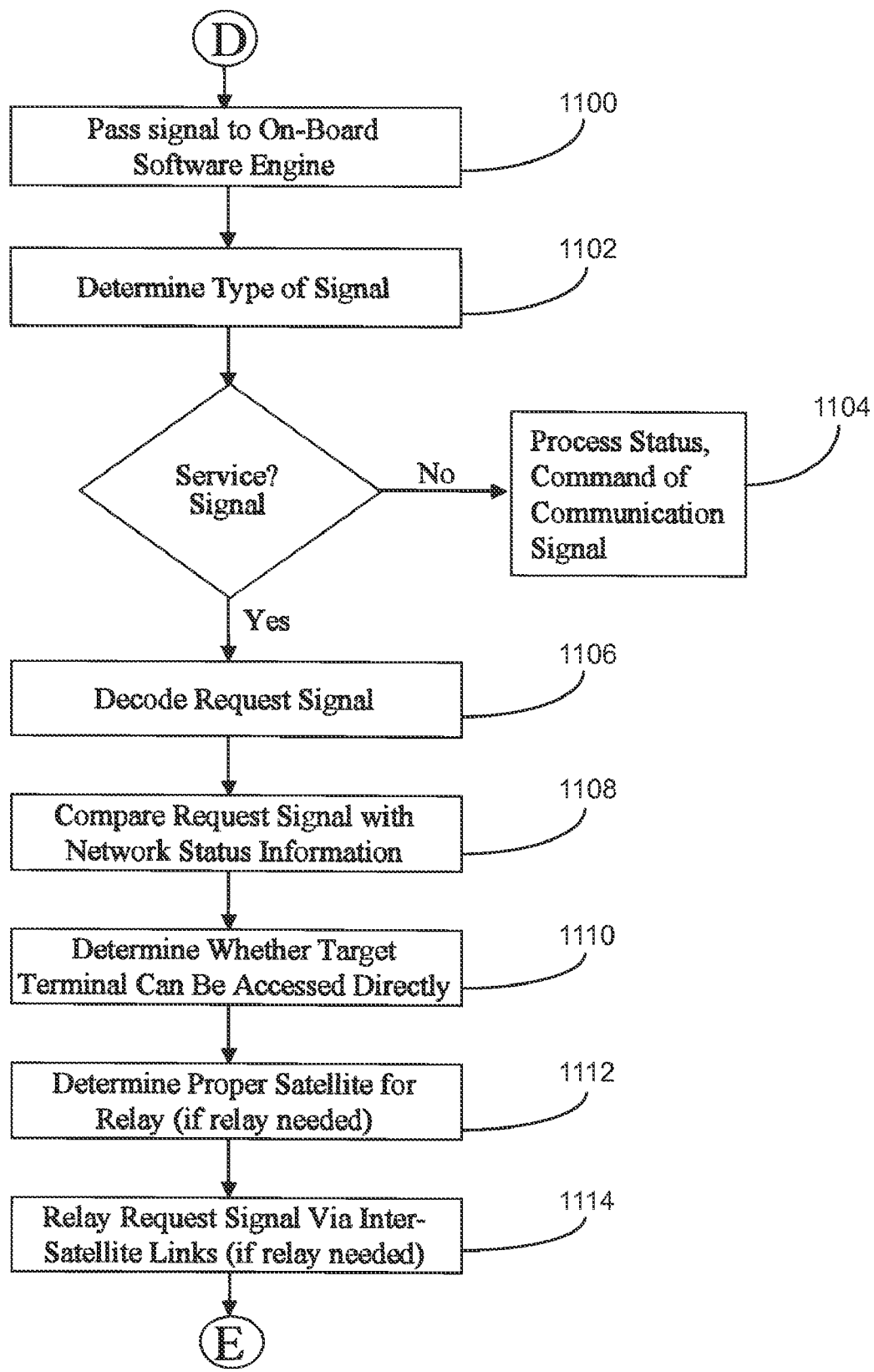
Figure 12:
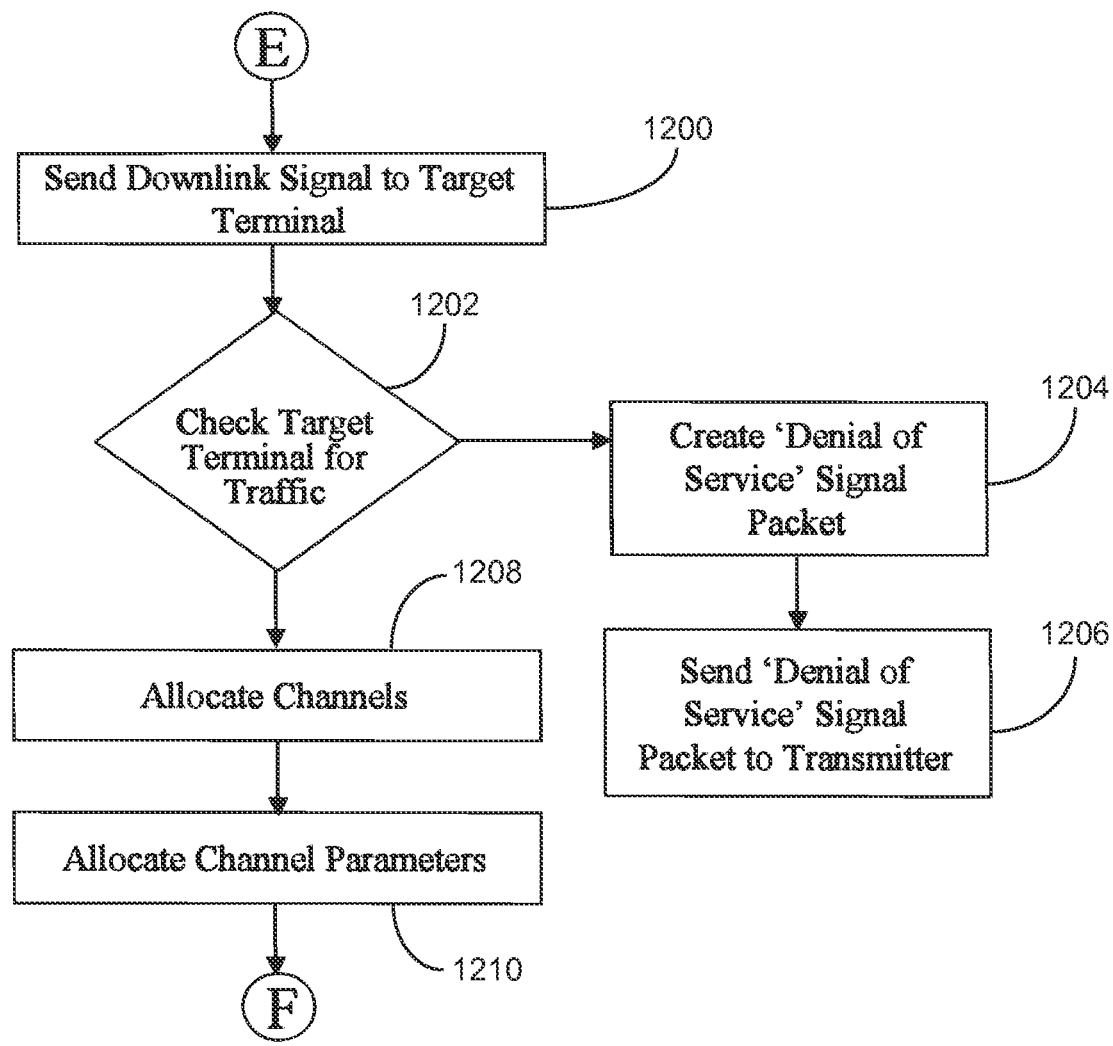
Figure 13:
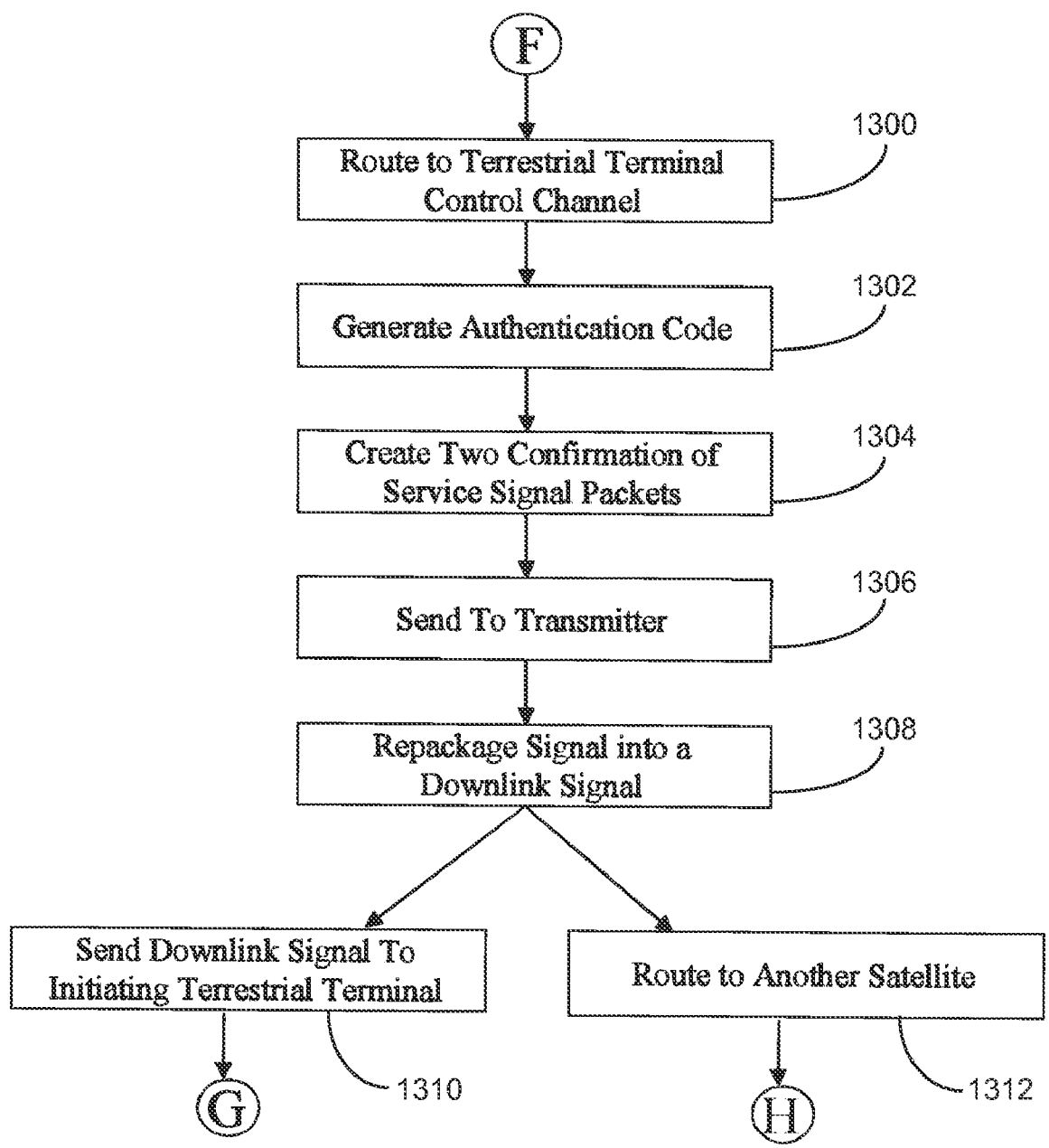
Figure 14:
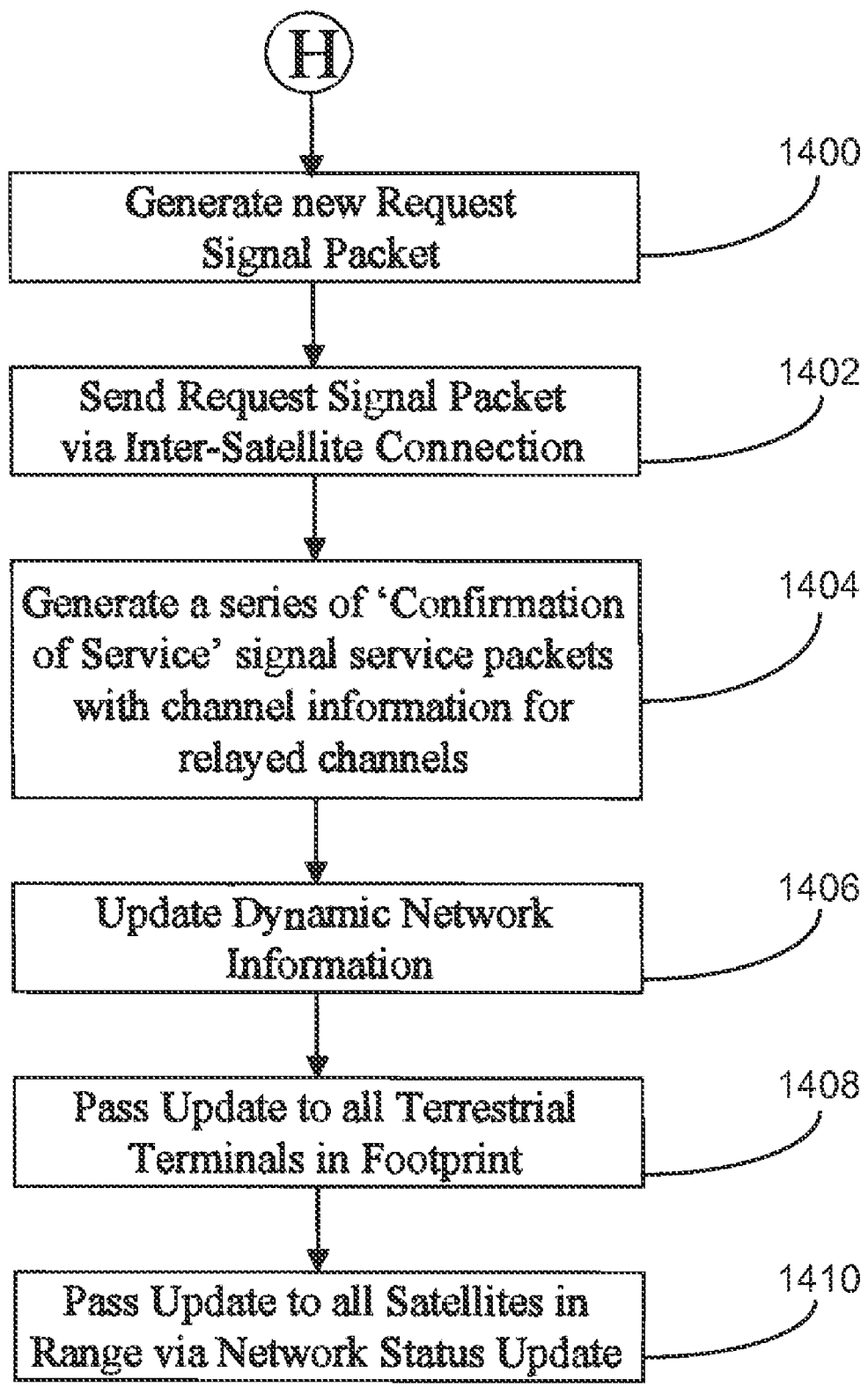
Figure 15:
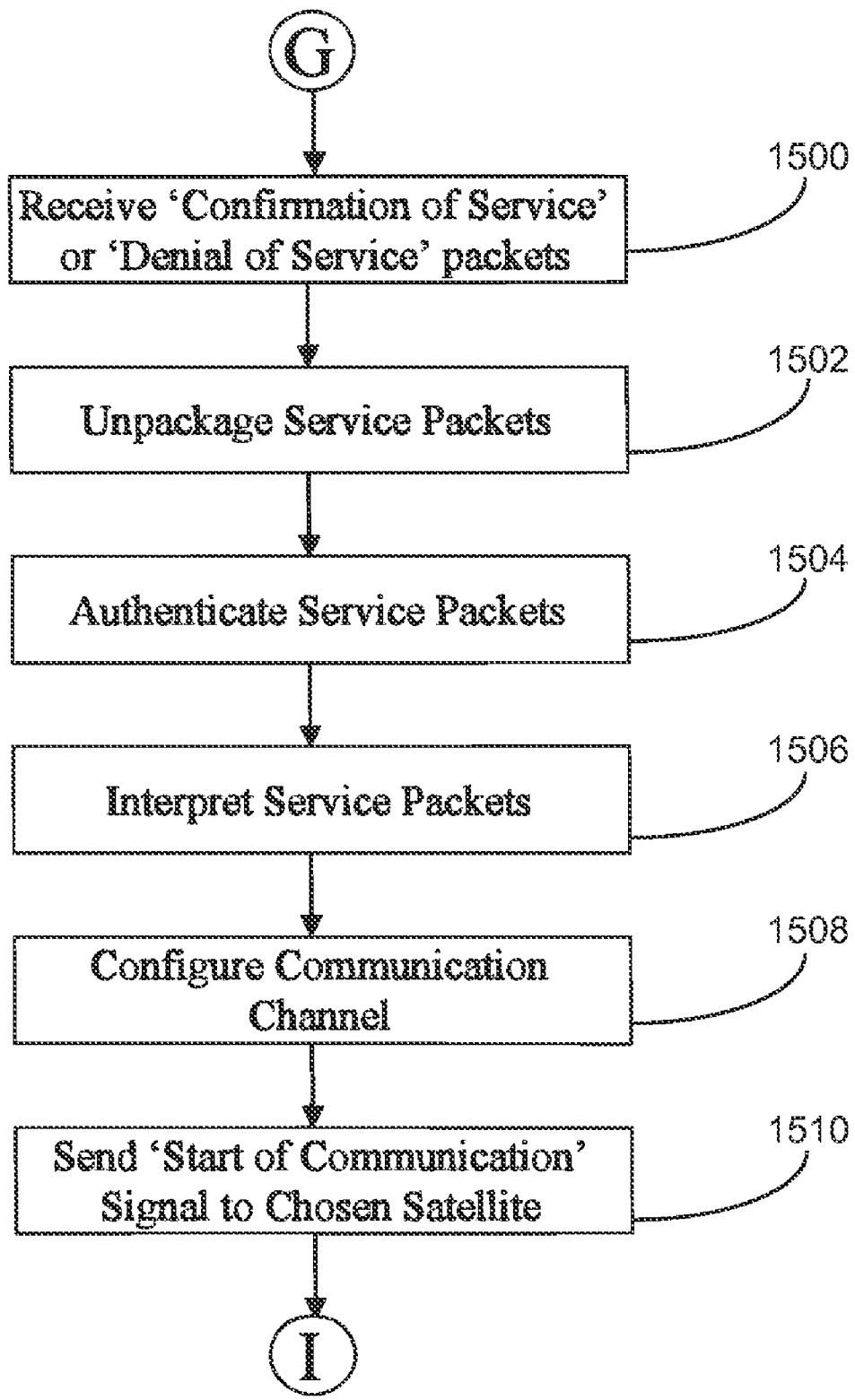
Figure 16:
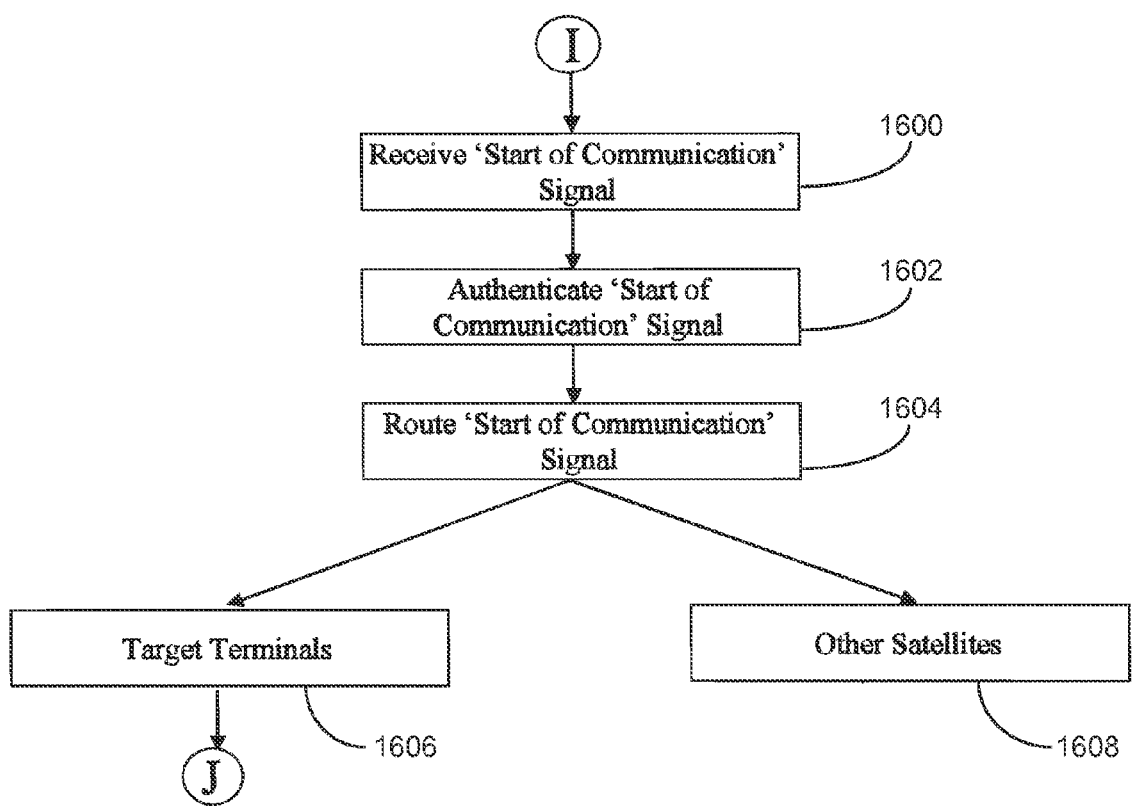
Figure 17:
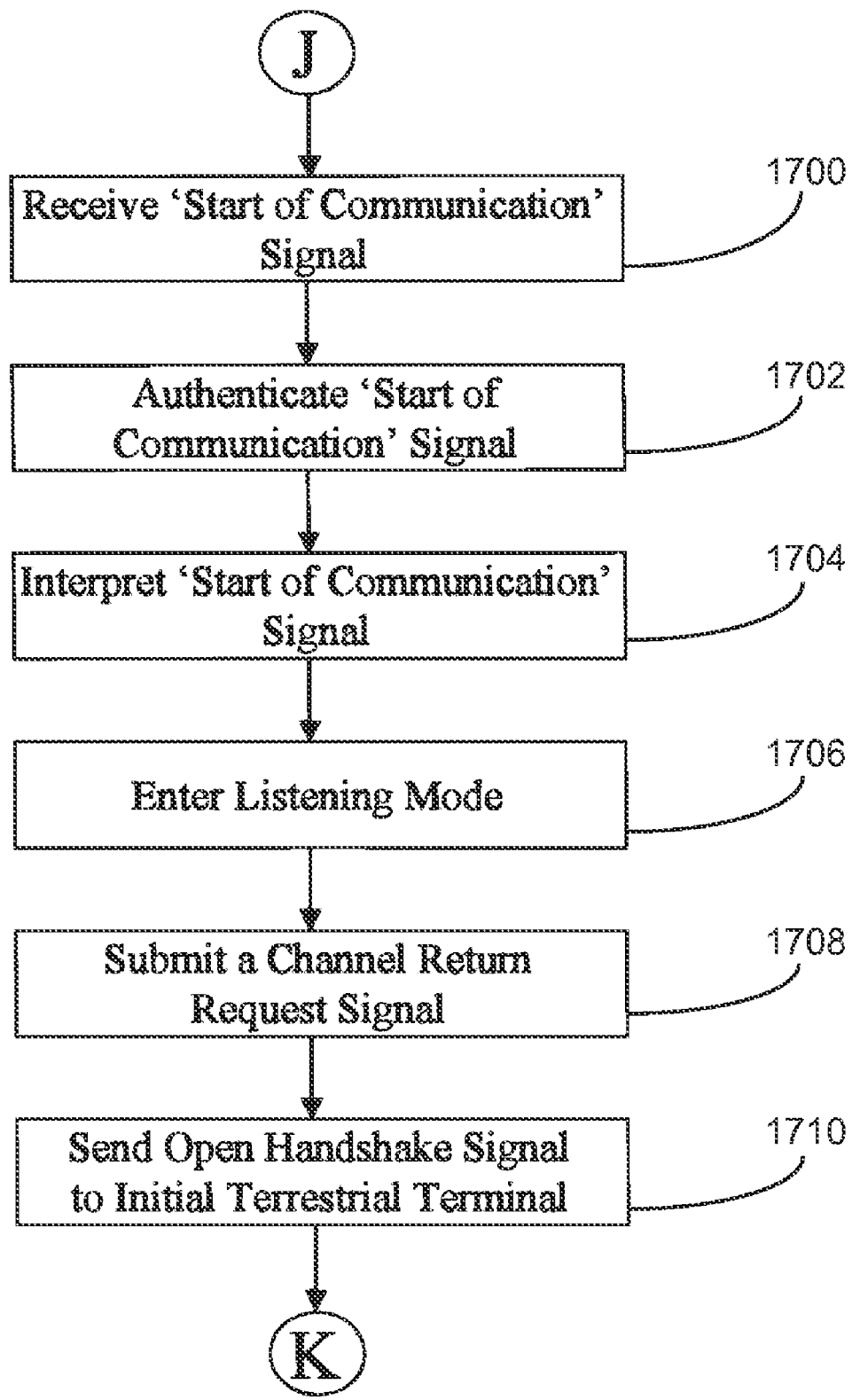
Figure 18:
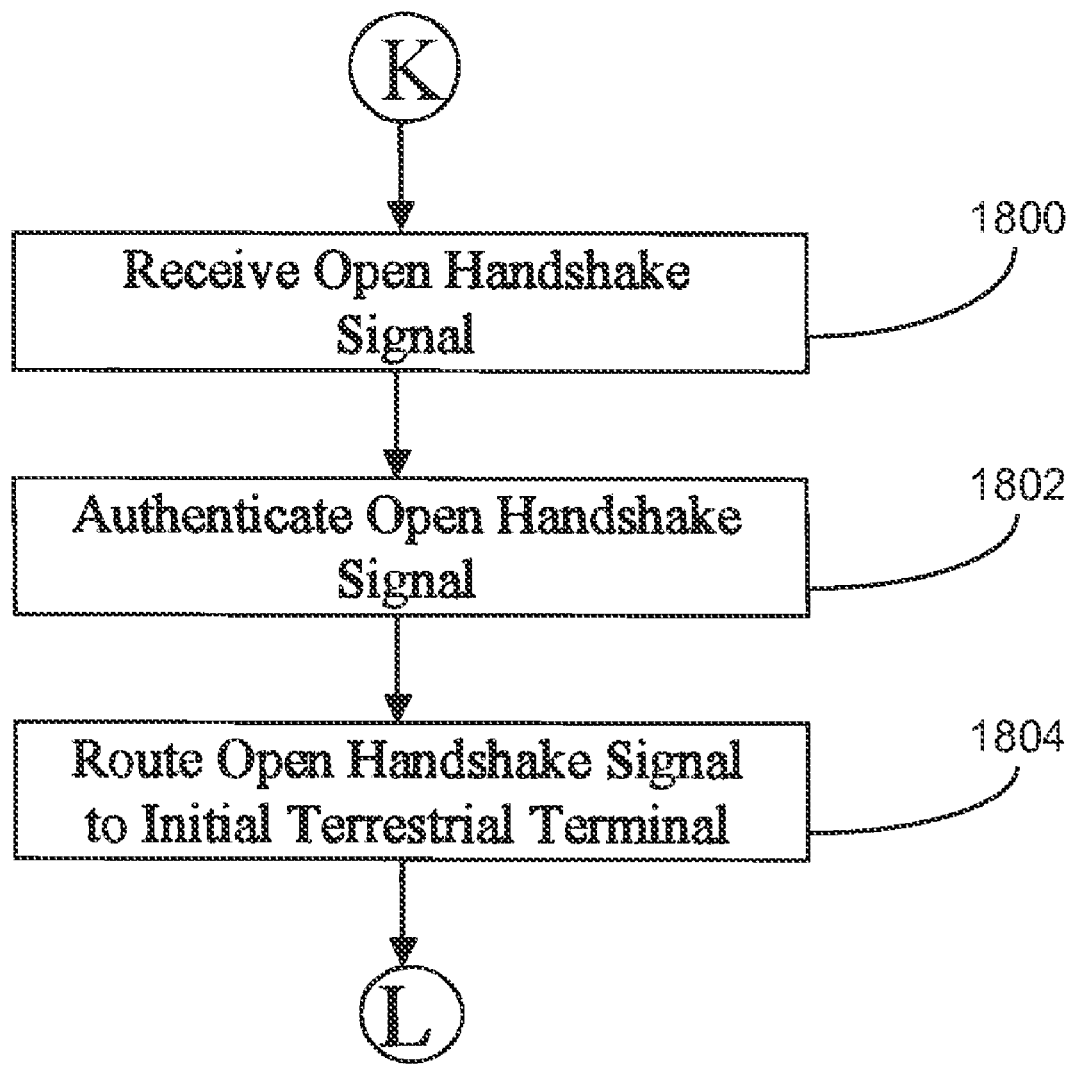
Figure 19:
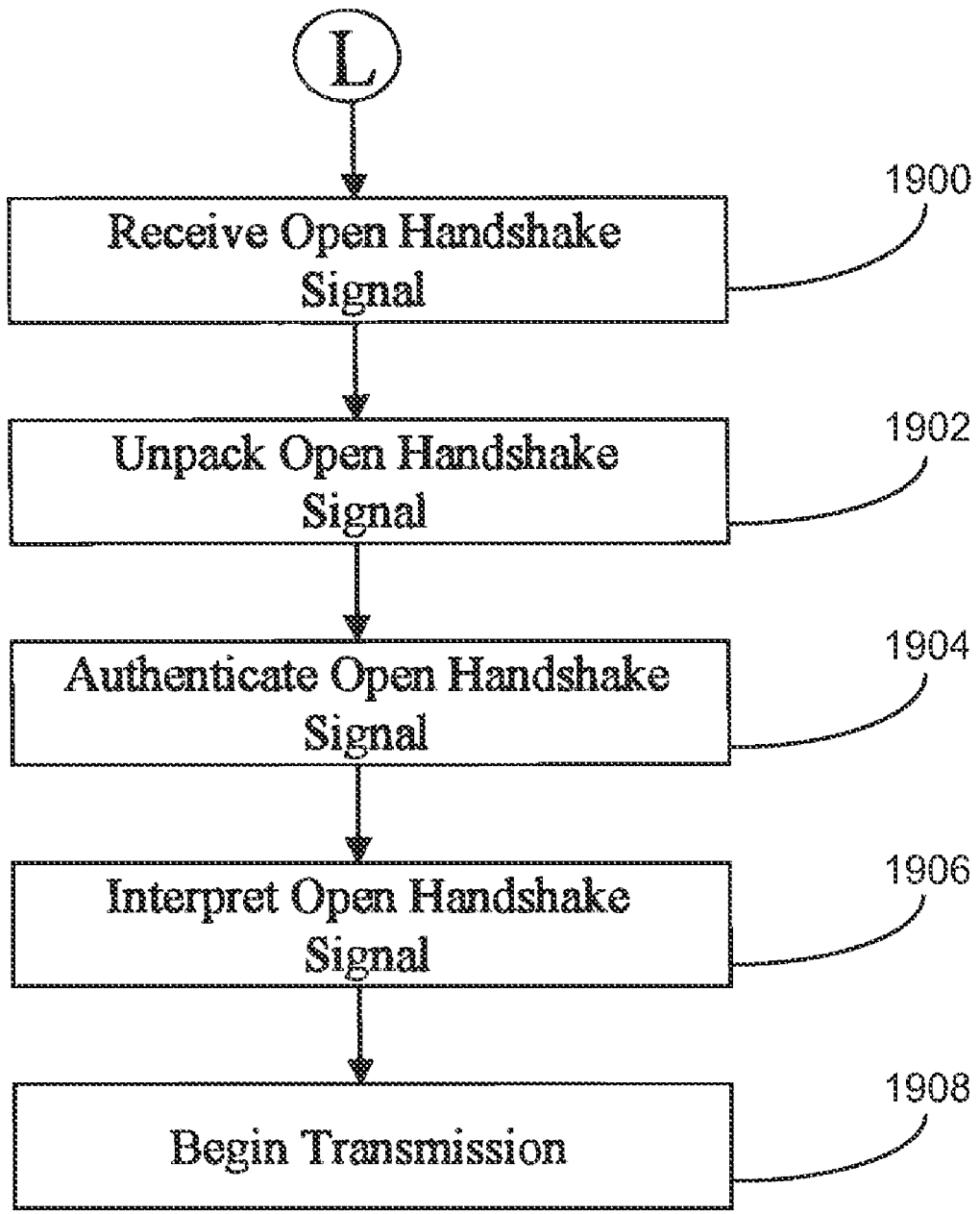
Figure 20:
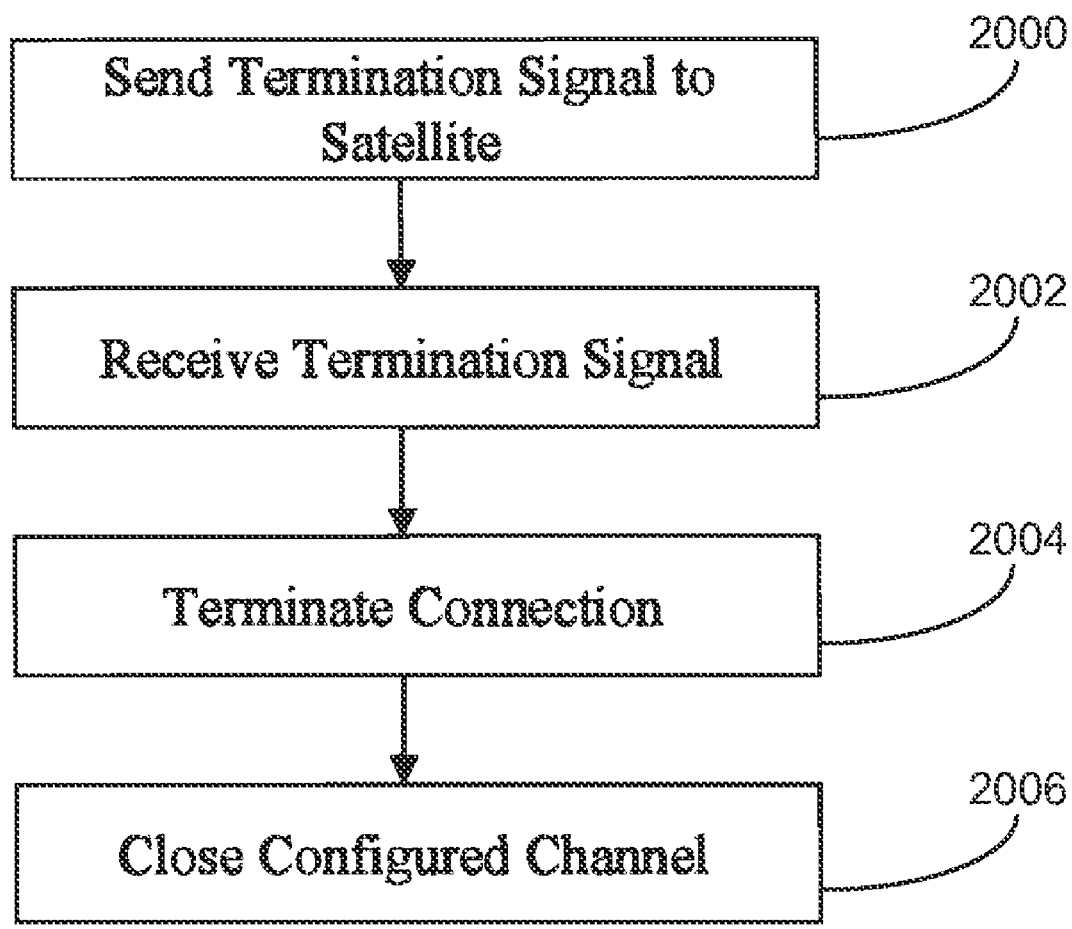

As shown in FIG. 6, the terrestrial terminals themselves, in an embodiment of an aspect of the present invention, in turn may comprise several main components. The terrestrial terminal may comprise an antenna 600, software 608 and hardware 606 to communicate with a satellite, including, but not limited to, a geostationary satellite, via an uplink frequency 120, 216. In one embodiment of this aspect of the present invention, the terrestrial terminal antenna 600 can be small, in the range of 75-2000 square centimeters in area. The antenna 600 may, in one embodiment, be a highly efficient parabolic reflector and/or a phased array design. The choice of antenna implementation may cause decreasing efficiency and therefore necessitate a corresponding increase in effective aperture area. This increase in effective aperture area is determined, at least in part, by the required linkbudget. The determined linkbudget is greatly improved, in an embodiment of one aspect of the present invention, by the use of regenerative payload and high power transponders.

In another embodiment, the uplink frequency is transmitted in narrow bands. These narrow bands are between 200-250 MHz wide per satellite on the Ku-band. To support communication with antennas of this size range, in another embodiment of the present invention, coordination with respect to other spacecraft is undertaken with respect to, but not limited to, orbital mechanics, coverage areas, frequency and time constraints. In this respect, the space-time dynamics of the spacecraft and communication parameters are coordinated in order to control the interference below acceptable and recommended limits. In particular, this may be achieved by use of non-frequently used frequencies and orbital positions including, but not limited to, geosynchronous orbits that may vary with time.

To support mobile operation and other functions, the software 608 running on a processor in the terrestrial terminal may have the ability to monitor and store data from a geoposition sensor 612 (such as are received by sensors receiving data from the Global Positioning System (GPS), Glonass, Galileo or similar services), as well as store information about the terrestrial terminal. In another embodiment of the present invention, the internal processing software 608 of the terrestrial terminal determines, from among a plurality of satellites in a satellite network, a satellite with which to communicate that best satisfies a set of preselected constraints. The terrestrial terminal software, according to an aspect of the present invention, performs automatic line-up and acquisition of a satellite. Internal processing software 608 in the terrestrial terminal, associated with other aspects of the present invention, include intelligent dynamic network routing software and access process. In the access process, the terminal is allowed, in one embodiment, to enter the satellite network on a dynamic non-interference basis. In yet another aspect of the present invention, the software could contain, but is not limited to, terrestrial terminal identification information, "make and model" information or capacity information. Furthermore, this information can be stored in a database 610 or other data structure 610 accessible to the terrestrial terminal.

In an embodiment of another aspect of the present invention, the terrestrial terminal contains hardware suitable for communication with a satellite including, but not limited to, an RF converter 602, internet protocol hardware 606 and xDMA 604.

Figure 5:
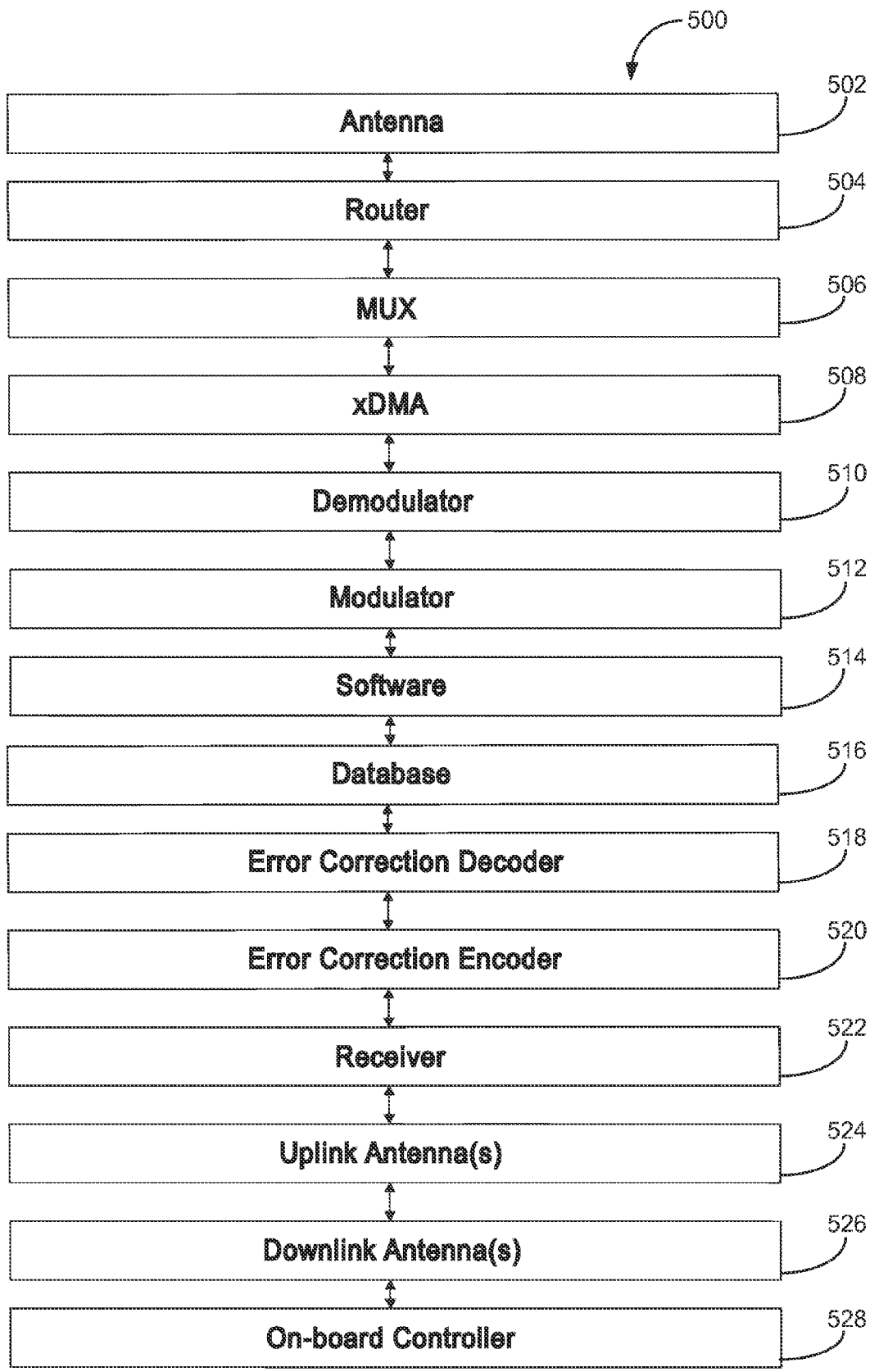
FIG. 5 shows a high-level view of the architecture of a satellite in an embodiment of a system and method according to the present invention.

Referring to FIG. 1, a second component of a system in accordance with the present invention is the space segment. The space segment may include one or a plurality of satellites 102, 104, 106, 108 arranged in a variety of constellations. Multiple satellites can be placed in the same "orbital box" 122. The orbital box 122 refers to the resulting constrained space created by a, most preferably geostationary, orbit having inclination less than 0.05° however less than 0.1° may be considered geostationary (restriction in the north-south direction), in the east-west direction the satellite is maintained within a band centered around an intermediate longitude with similar accuracy, here the resulting constrained space is referred to as the "orbital box" 122 and/or located in different orbital boxes 122. As shown in FIG. 5, each satellite may comprise several components, including but not limited to a router 504, a multiplexer 506, xDMA processing capability 508, a demodulator 510, a modulator 512, an error correction decoder 518, an error correction encoder 520, a receiver 522, a transmitter, one or a plurality of uplink 524 and downlink antennas 526, an on-board controller 528, software 514, firmware or hardware-implemented logic for running these various functions, and a database 516. This and other suitable hardware and software work together according to various aspects of the present invention, to enable the satellite, or a plurality of satellites, to act as a "hub" in space. In one embodiment of the present invention, each satellite may utilize an open on-board architecture.

The on-board software and hardware, further described below, permits the satellite to perform data handling functions, such as routing and traffic management, without the need to communicate with a ground hub located on Earth. This aspect of the present invention, along with the presence of a regenerative payload, in turn, permit a variety of communications benefits. These benefits include but are not limited to "symmetrical" links between two terrestrial terminals and a resultant a need for only a single type of terrestrial terminal and antenna, and a more secure architecture, in which the hub is located over 22,000 miles from the earth and is therefore relatively invulnerable to attack or other compromise. The "hub" functionality of the space segment, in one embodiment, may be contained in one satellite. In an alternate embodiment, the hub functionality is distributed among all of the space segment assets. Locating the hub in the space segment results in the need for less bandwidth as well as time savings when transmitting communications and other signals.

Figure 30A:
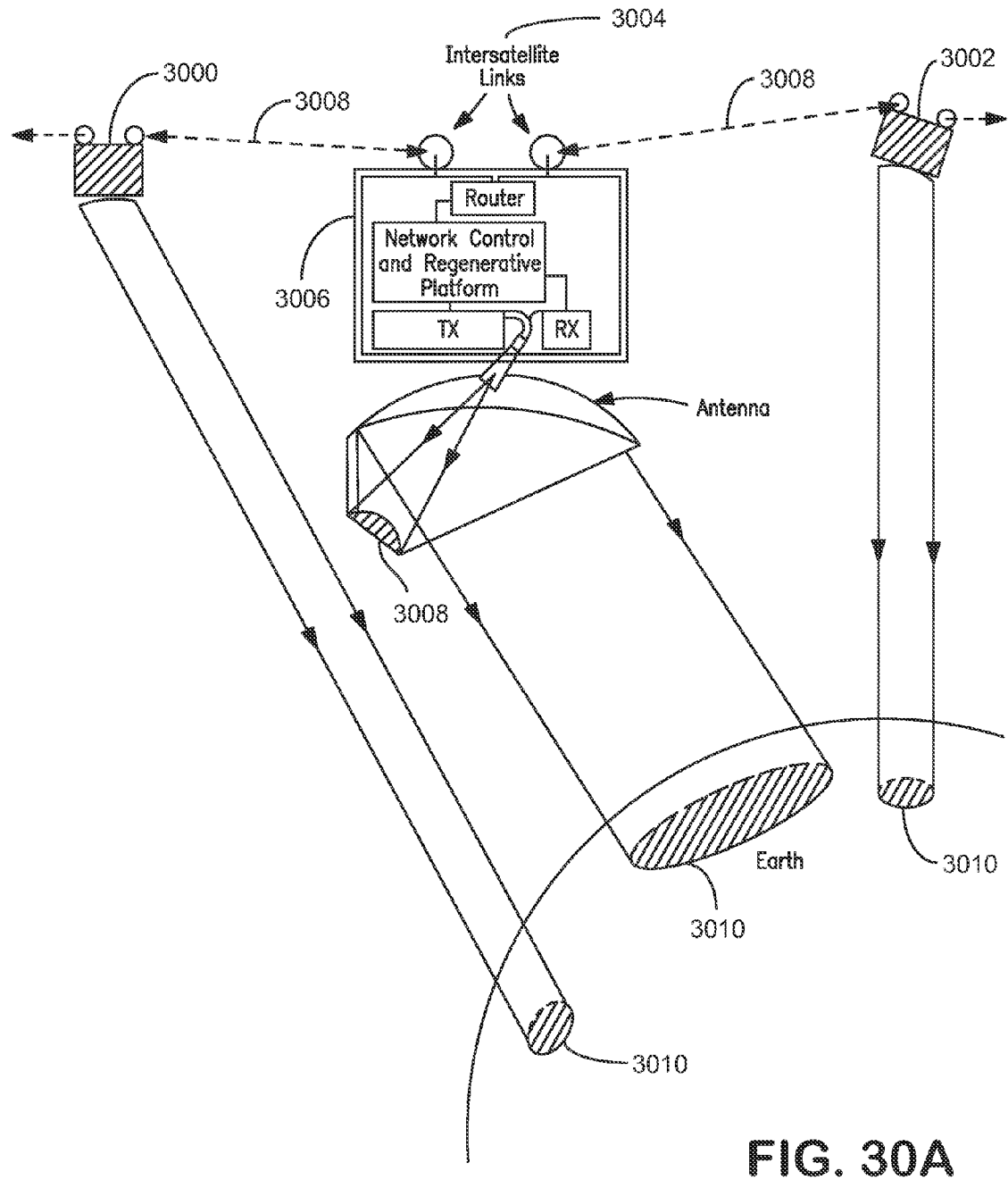
FIG. 30 shows a high-level view of an embodiment of a system and method, according to the present invention, for providing satellite communications.
Figure 30B:
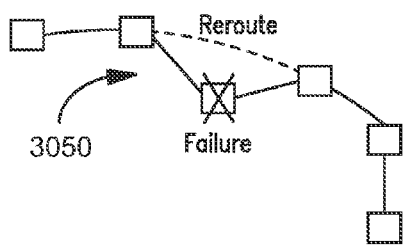

FIG. 30A provides an example of an embodiment of the space segment. Multiple satellites 3000, 3002 in the space segment communicate via intersatellite links 3004. On-board software and hardware 3006 facilitates the data handling functions described above, and the satellite can either transmit a signal to another satellite in the space segment 3008 or to a terrestrial terminal in the earth segment 3010.

Figure 4:
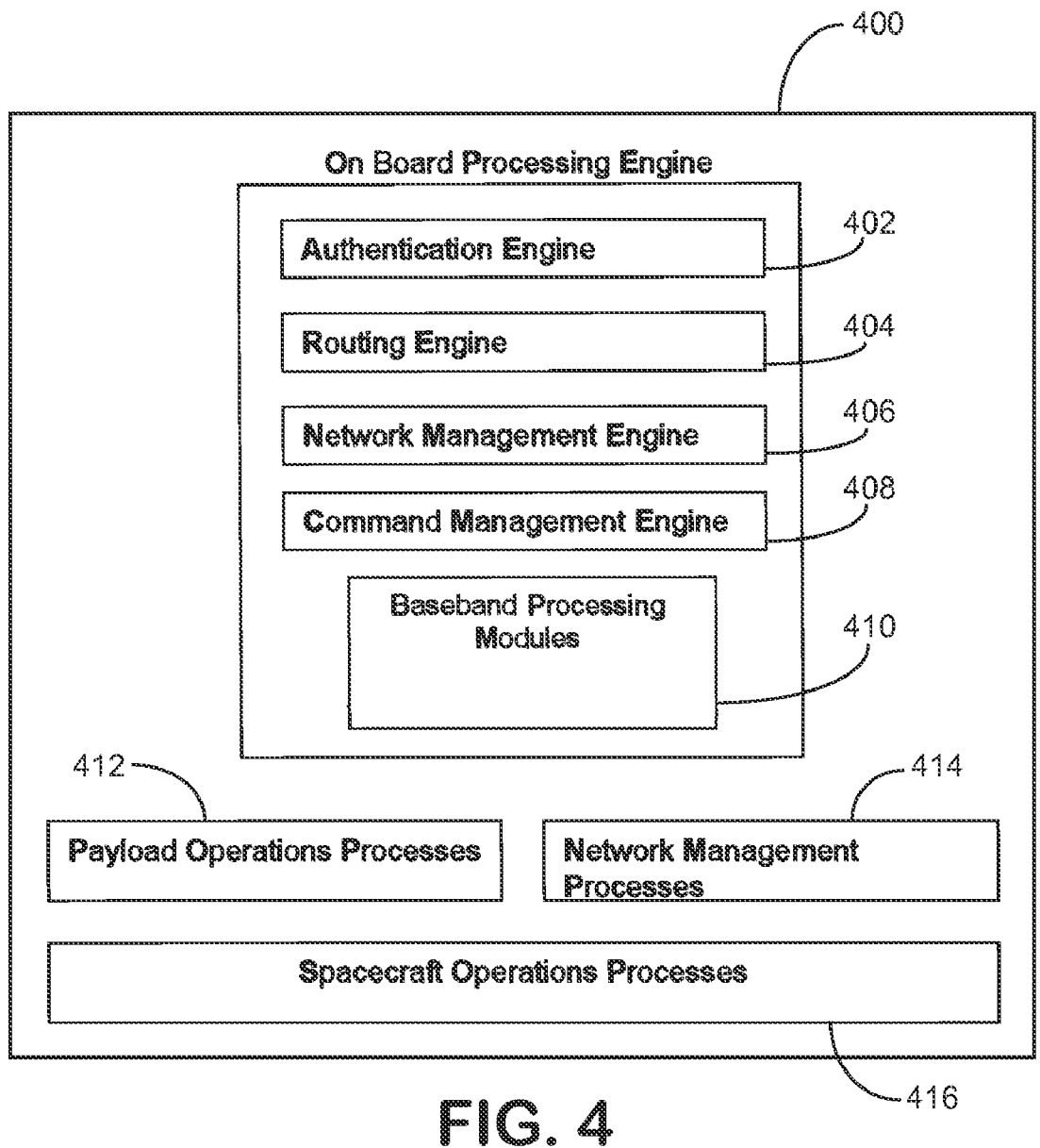
FIG. 4 shows a high-level view of the software of a satellite in an embodiment of a system and method according to the present invention.

Referring to FIG. 4, in another embodiment of an aspect of the present invention, multiple software "engines" 400 perform on-board data handling functions. An authenticating engine 402 is responsible for authenticating a signal sent from one or a plurality of terrestrial terminals. A routing engine 404 routes the authenticated signal. In one aspect of present invention, the routing engine determines whether a signal is addressed to the actual satellite or comprises a relay signal that is addressed to another satellite. Third, a network management engine 406 manages the internal network of the satellite. Further, a command management engine 408 processes payload command signals, which may be commands to alter the payload itself. Still further, one or more baseband processing modules 410 perform processing on the signal. Finally, software running on the satellite comprises payload operations processes 412, network management processes 414 and spacecraft operations processes 416.

The software, in an embodiment of one aspect of the present invention, may be run on one or a plurality of processors. Further, in another embodiment, the satellite may utilize state-of-the-art programmable processors for digital signal processing allowing implementation of reconfigurable on-board processing including changing of signal packaging and alteration of channel parameters through filters implemented in software. Still further, in one embodiment, the satellite architecture is based on reconfigurable digital signal processors allowing for expanded development opportunities in terms of configuring the redundancy performance of the payload. This increases the flexibility in dealing with a loss of one or more digital signal processing units.

According to another aspect of the present invention, the software, which may include a database, can process and store relevant satellite usage information, including billing information, and other information that can be monitored and stored. This information may include, but is not limited to, detailed terrestrial terminal antenna performance characteristics—including, in one embodiment, measured radiation patterns that may be general or specified individually—RF component characteristics, other important parameters for link performance calculation, up and downlink frequency, quality of service requirements and prioritization class.

The satellites also comprise one or a plurality of antennas that can be used to communicate with other satellites as well as broadcast, both uni-cast and multi-cast, signals to terrestrial terminals on Earth. In another embodiment, the satellite utilizes one or a plurality of steerable antennas. In yet another embodiment, the satellite utilizes one or a plurality of steerable spot beam antennas. The use of steerable beams makes the satellite less prone to jamming, as jamming a moving beam requires the jammer to be within the beam, which may mean the jammer will be detectable and also within a sphere of influence of a moving formation—depending on satellite footprint. Furthermore, the size of the satellites used is smaller than satellites that are typically used. In one aspect of the present invention, the satellites have a launch mass of 800 kg or less.

A third component of the system is a second group of target terrestrial terminal(s) that may or may not include the initiating terrestrial terminal. In one embodiment, the target terrestrial terminals have the same capabilities as the initiating terrestrial terminal described above. However, the individual target terrestrial terminals in the group may have different hardware and software components, particularly different antenna sizes. In an embodiment of one aspect of the invention, the target terrestrial terminals comprise at least one antenna between about 75 and 2000 square centimeters in area. Also, some of the target terrestrial terminals may be stationary while others in the group are mobile, or they may be all mobile, or all stationary.

Referring to FIGS. 7-20, An embodiment of a method according to the present invention involves initiating satellite communications service. The embodiment is described by way of an example involving earth segment terrestrial terminals and a space segment satellite network. Satellite communication service begins, for example, by a user entering an authorization code 700 into an initiating terrestrial terminal located in the earth segment of a satellite communications system. In one embodiment, the authorization code is pre-assigned to the terrestrial terminal. In another embodiment, the authorization code is pre-assigned to a user of the system, allowing them to use any terrestrial terminal. In yet another embodiment, the authorization code is distributed to the user with the terminal or with the service procurement. The authorization code may also be specific to a type of vehicle. In order to initiate the service, the initiating terrestrial terminal may first be configured 702, for example by the internal software. The initiating terrestrial terminal may require and unpack password or other security information in order to activate the terminal.

The initiating terrestrial terminal searches for the nearest satellite in the network 704. In one embodiment, the internal processing software of the terminal analyzes the satellites potentially available for communication and determines the most appropriate satellite. The authorization is completed over the nearest available satellite in the network 706. In another embodiment, the authorization is completed over the most appropriate satellite for communication as identified by the initiating terrestrial terminal 706. The satellite chosen may be a geostationary satellite, low earth orbit satellite, or mid-earth orbit satellite.

An embodiment of a method according to the present invention involves using a satellite communications service to transmit a communication between two terrestrial points. The embodiment is described by way of an example involving an initiating earth segment terrestrial terminal, a space segment satellite network and a target earth segment terrestrial terminal. The initiating terrestrial terminal sends a communication via an uplink frequency to a satellite in a satellite communications network. In one embodiment, the satellite is chosen according to the procedures previously presented 800. In another embodiment, the satellite is chosen manually by the operator of the initiating terrestrial terminal 800. In yet another embodiment, a plurality of possible satellites is chosen by the operator of the initiating terrestrial terminal 800. In this embodiment, the initiating terrestrial terminal software compares the chosen targets against a list of targets reached from each box/satellite/beam 802. In this embodiment, the list is constantly updated via a network status updates channel. The initiating terrestrial terminal next assembles a signal that requests service from the space segment via the satellite 804. In one embodiment, this signal specifies a target terminal listed by box/satellite/beam, type of service and bandwidth required.

Once the terrestrial terminal assembles the request signal, the terrestrial terminal software engine analyzes the alternative routes to reach the target terminal 806. In one embodiment, the initiating terrestrial terminal determines the best route in terms of latency, traffic, capacity limits and other information on the network status updates channel. In another embodiment, the routing analysis is still performed in the case of key users with a meta-status layer. The initiating terrestrial terminal software engine may create a routing address 808 and an authorization code 810 to append to the request for service signal, thereby creating a request signal packet 812.

Next, the initiating terrestrial terminal software engine searches for 814, acquires 816 and lines up 818 an antenna plus a set-up of communication parameters on the chosen satellite. Further, in another embodiment, the initiating terrestrial terminal software engine searches for and acquires a download of option files from the satellite hub. In one embodiment, this step is completed using the satellite's unique identifier. The software engine packages the request signal 820 by setting the correct terminal hardware parameters for interleaving, modulating and encoding the digital data signal packet into a microwave signal with parameters appropriate for the target satellite request channel. The initiating terrestrial terminal sends the request signal packet to the chosen satellite 822.

The chosen satellite in the space segment receives the request signal packet 900. The satellite then starts a procedure to initiate a connection between the initiating terrestrial terminal and the target terrestrial terminal. In one embodiment, the receivers in the satellite payload receive the request signal packet 900. The receivers may, in one embodiment, unpack the request signal packet 902. In another embodiment the receivers unpack the header that contains the routing address and authentication code and also unpack the remaining portion or portions of the signal. The unpacked signal is sent to an on-board software engine for processing 904.

Once received by the on-board software engine, the engine authenticates the authentication code using a security protocol 906. The authenticated signal is then, in one embodiment, passed to another on-board software engine to route the signal 908. An on-board software engine determines whether the signal is addressed to the actual satellite or if it is a signal to be relayed. In one embodiment, in either case, the signal is passed to another on-board software engine for processing 910. The on-board software engine than appends the signal with the original routing address 912 and a new authentication code 914 and sends the signal back to the satellite transmitter 916. The signal is then repackaged into a downlink signal 918.

In one embodiment, all request signals, network updates and other network and command channel updates are addressed to the target satellite. In another embodiment, all signals addressed directly to a satellite can be authenticated for a second time by the on-board software engine via a second authentication code 920.

If the system, at any point, detects an unauthorized signal, the incident 1000 and origin 1002 of the signal may be logged and/or a message is sent to a network 1004 and sub-network administrator 1006 and/or an access denied message is sent back on the command channel of the accessing terminal 1008. In one embodiment, the incident and origin are logged in a database on-board the satellite. The incident and origin of the unauthorized signal may be tracked by triangulating the unauthorized signal by using information from more than one satellite in the network. A successful or partly successful triangulation may then be sent to a control center in an earth segment.

After the second authentication, a signal destined for the satellite is passed to an on-board software engine 1100. The on-board software engine determines whether the signal is a service signal, command signal or a network signal 1102. A service signal, such as a request signal, is interpreted by the on-board software engine which allocates channels to the requested service and sends the appropriate information onwards. A command signal is sent to alter a network configuration. A network signal updates on network status and the on-board software engine interprets the signal to provide latest information for dynamic routing by the on-board software engine that handles routing. In one embodiment, the signals may be routed to different on-board software engines 1104.

In one embodiment, the service signal, of which one type is a request signal, is routed to an on-board software engine which interprets the signal 1102. For a request signal, the on-board software engine decodes the request signal list 1106 and compares it with the network status information stored on-board 1108. In one embodiment, for every target, the on-board software engine determines if the target can be accessed directly from that satellite 1110. In another embodiment the on-board software engine determines via which beam, if any, the target can be accessed directly 1110. In an alternate embodiment, the on-board software engine determines the proper satellite, in the satellite communications network, to receive the relay signal 1112 via inter-satellite links 1114.

The current satellite sends the downlink signal to the target terrestrial terminal 1200. The on-board software engine checks the target terrestrial terminal for traffic 1202. If the target terrestrial terminal is available, the on-board software engine allocates the channels 1208 and channel parameters 1210 for communication between the initiating terrestrial terminal and the target terrestrial terminal. In one embodiment, the on-board software engine uses an on-board software engine that performs routing to add the routing address back into the initiating terrestrial terminal's control channel 1300.

In one embodiment, the on-board software engine uses an on-board software engine that performs authentication to generate an appropriate authentication code 1302. The routing address and authentication code are combined to make a confirmation of service signal packet. The on-board software engine also forms a second confirmation of service signal packet for the target terrestrial terminal 1304. If the terminal is busy, the on-board software engine generates two denial of service signals stating that no connection is available 1204. The confirmation of service signal packet(s) 1304 or denial of service signal packet(s) 1204 are sent to the transmitter 1306, 1206. In one embodiment, the transmitter repackages the signal with the appropriate channel parameters into a downlink signal 1308 to the target terrestrial control channel 1310.

In an embodiment of another aspect of the present invention, the downlink signal is sent from a satellite that is different from the current satellite 1312, i.e. the current satellite routes the signal to a target satellite via in-box or inter-box communication. In this embodiment, the on-board software engine, in the current satellite, generates a new request signal packet 1400 with a new routing address, authentication code and request signal content appropriate to the target satellite. The on-board software engine may utilize other on-board software engines that handle routing and authentication to generate the new request signal packet. The on-board software engine sends the new request signal packet to the inter-satellite link 1402. In one embodiment, the on-board software engine also generates a series of confirmation of service signal packets back to the initiating terrestrial terminal with channel information for the relayed channels 1404. In another embodiment, the on-board software engine updates the dynamic network information 1406 and passes the update on to all terminals it covers 1408 and to all other satellites in the space segment through a chain satellite-to-satellite via a network status update broadcast 1410. Each satellite in the chain may be equipped with two inter-satellite links where a new satellite connects on one loose end of the chain while some links of the chain will connect within the orbital box and some will enable communication between orbital boxes.

Next, the initiating terrestrial terminal receives the confirmation of service or denial of service packets 1500. In one embodiment, the initiating terrestrial terminal unpackages 1502, authenticates 1504 and interprets 1506 these packets. The initiating terrestrial terminal configures a communication channel 1508 and sends a start of communication service signal packet to the chosen satellite 1510. The chosen satellite receives the start of communication service signal packet 1600, authenticates it 1602 and routes it appropriately 1604, to other satellites 1608 and/or other target terrestrial terminals 1606. In one embodiment, the service signal packet is received by an on-board software engine, while the routing and authentication steps are processed by on-board software engines that handle routing and authentication respectively.

The target terrestrial terminals also receive the confirmation of service signals 1700 and configure communications channels. In one embodiment, these target terrestrial terminals may then go into listening mode 1706. In another embodiment, these target terrestrial terminals submit a return channel request signal 1708.

The target terrestrial terminal receives 1700, unpacks, authenticates 1702 and interprets 1704 the start of communication signal and sends a channel open handshaking signal back to the initiating terrestrial terminal 1710.

The satellite receives 1800, authenticates 1802 and routes 1804 the channel open handshaking signal to the initiating terrestrial terminal. In one embodiment, the channel open handshaking signal is received by an on-board software engine, while the routing and authentication steps are handled by on-board software engines that process routing and authentication respectively.

The initiating terrestrial terminal receives 1900, unpacks 1902, authenticates 1904 and interprets 1906 the channel open handshaking signal and then begins transmission 1908.

To end transmission, the transmitting terrestrial terminal sends a termination signal 2000. The satellite receives the termination signal 2002 and terminates the connection 2004. The satellite transmits the termination signal to the target terrestrial terminal and the target terrestrial terminal closes the configured channel 2006. The configured channel may be conserved under silent periods without termination and may be set to "stand by" mode until the signal reappears, which may occur due to blockage and temporary link fades. However, this may be regarded as permanent if the silent period extends for a longer time period than the time-out period which may be defined according to the expected link characteristics and depending on transponder load.

The ability to operate from a single user channel to multiple target is already built into the point to point communication described above. In one embodiment, target terrestrial terminals might be spread out over several satellites, or beams. In each case, the on-board software engine is robust enough to split the request signal to create immediate confirmation of service signals plus relay signal groups with virtual channels. For target terminals not covered by the current satellite, the on-board software engine will create a single confirmation of service package and send it to the appropriate other satellite(s) in the satellite communications network. In one embodiment, the initiating terrestrial terminal will only need to configure one uplink channel for the broadcast. The initiating terrestrial terminal begins service as soon as it receives its first channel open handshaking signal i.e., it does not have to wait for a confirmation of service signal or a denial of service signal from each target terminal. In another embodiment, the initiating terrestrial terminal does not need to wait for the first channel open handshaking signal to begin service.

A network embodying an aspect of the present invention accommodates multiple point-to-point communications, for example, such as might occur in a conference situation. In this case, the method of point to point communication may be followed in both directions. An on-board software engine identifies a need for two-way communications and therefore a confirmation of service signal directed at each target terrestrial terminal includes instructions to allocate both receive and transmit channels. A terrestrial terminal may have to wait for a channel open handshaking signal before starting its own broadcast. Alternatively, a terrestrial terminal need not wait for a channel open handshaking signal before starting its own broadcast.

Figure 23:
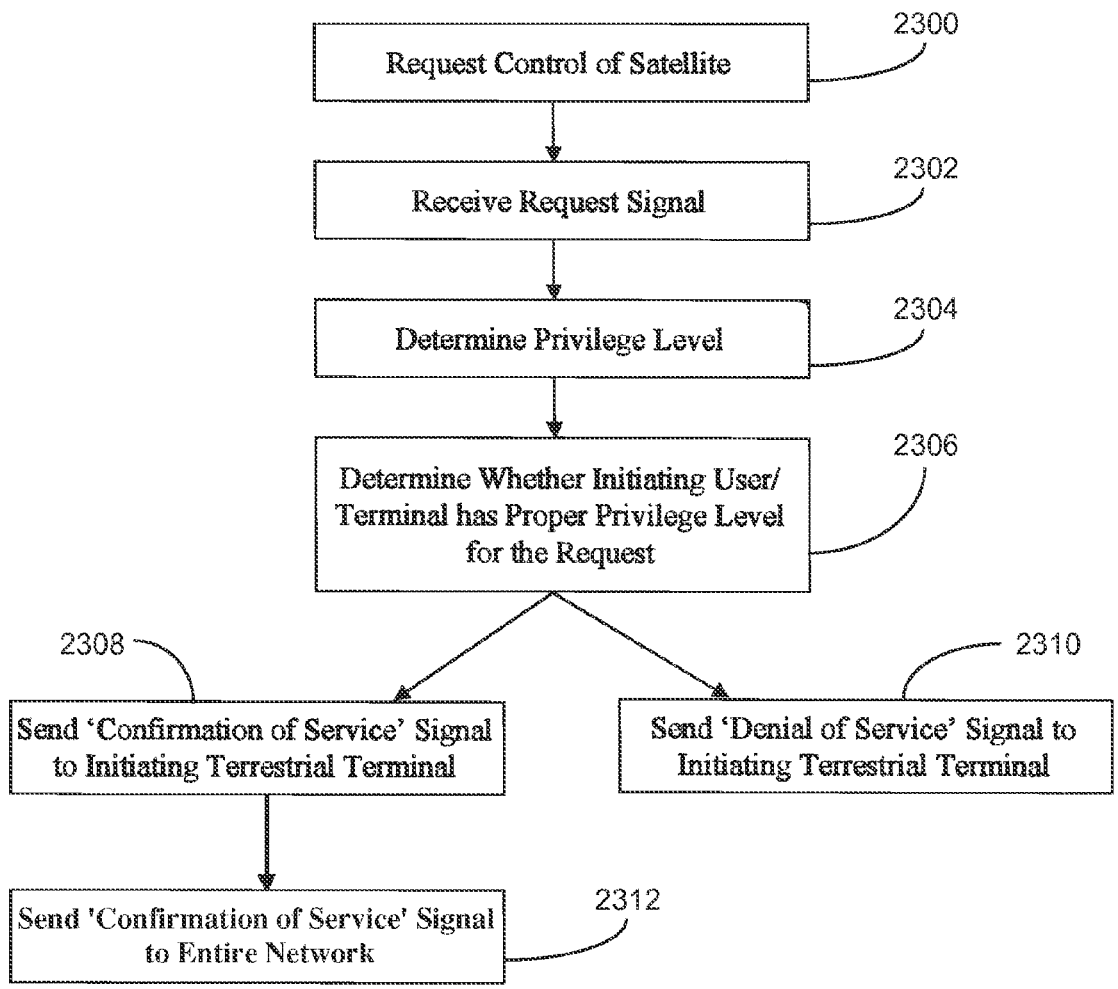
FIG. 23 shows, in flowchart form, steps associated with an embodiment of a method, according to the present invention, for initiating customer/user control of a satellite.

As shown in FIG. 23, an embodiment of an aspect of the present invention provides for allowing user access to control of a satellite or specific components of a satellite. A user requests direct control of one or a plurality of satellites and/or satellite component(s) 2300 by sending a request signal from an initiating terrestrial terminal. This request signal is sent via an uplink frequency to a satellite. Upon receipt of the request signal 2302, the satellite unpacks the signal and routes the request to an appropriate software engine. The software engine receives the identification of the user from the request and determines the privilege level of the user 2304. In an alternate embodiment, the software engine receives the identification of the initiating terrestrial terminal from the request and determines the privilege level of the terminal. In one embodiment, the privilege levels of each approved user and terrestrial terminal in the network reside in a database located in each satellite in the network. To determine the privilege level of the user or terminal 2304, in this embodiment, the appropriate software engine maps the user identification, received in the uplink request, to a privilege code stored in the database.

A plurality of privilege codes may apply to a corresponding plurality of customer access levels. The software engine, in one embodiment of this aspect of the present invention, determines whether the specific user or terminal requesting satellite control has the proper customer access level to grant the request 2306. If the customer access level is not proper, the software engine sends a denial of service signal via a downlink frequency to the initiating terrestrial terminal 2310. If the customer access level is proper, the software engine sends a confirmation of service signal to the user via a downlink frequency to the initiating terrestrial terminal 2308. In another embodiment, the software engine also sends a confirmation of service signal to other terrestrial terminals within the network 2312.

Figure 24:
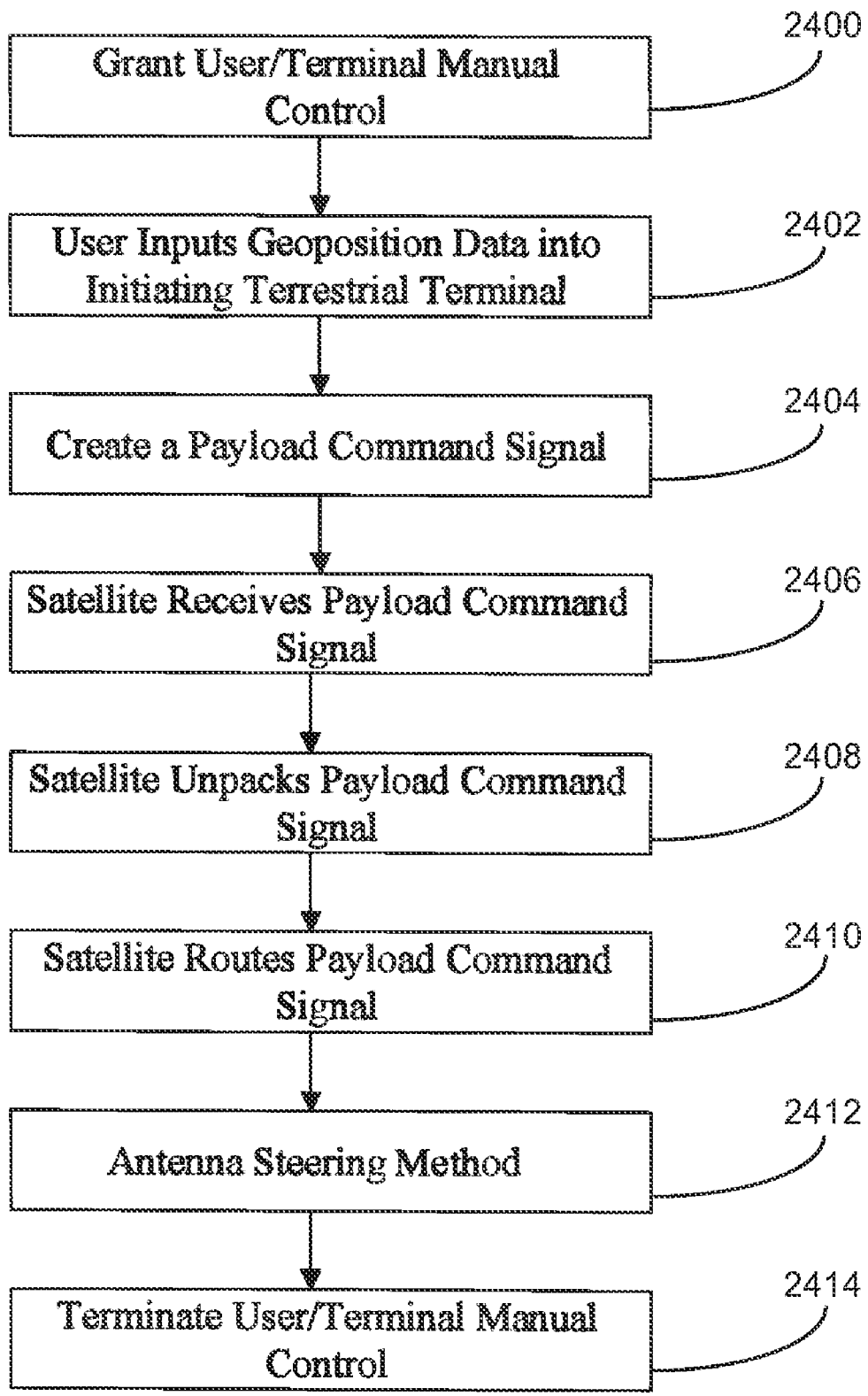
FIG. 24 shows, in flowchart form, steps associated with an embodiment of a method, according to the present invention, for providing customer/user control of an antenna on a satellite.

As shown in FIG. 24, in one embodiment of the present invention, the request signal specifies a request for manual control of one or a plurality of steerable antennas on the satellite. After the user receives a confirmation of service signal, the user can control, from the initiating terrestrial terminal, one or a plurality of steerable antennas 2400. In one embodiment of this aspect of the invention, the user enters geoposition data corresponding to the desired area of satellite coverage into the initiating terrestrial terminal 2402, which is packaged into a payload command signal 2404.

Once this type of specific terrestrial terminal is approved for controlling the steerable satellite antenna/beam the terrestrial terminal, in one embodiment, will automatically transmit position data to the satellite. When the terrestrial terminal moves, it will continue to automatically send geoposition data to the satellite. The geoposition data may be sent even if the terrestrial terminal is not moving.

The satellite receives 2406 and unpacks 2408 the payload command signal and routes the signal to an appropriate software engine 2410. The software engine uses the geoposition data sent from the terrestrial terminal to change the antenna pointing direction 2412 towards a specified location. The new geoposition pointing of the antenna is then sent to the initiating terrestrial terminal. In another embodiment, the new geoposition pointing of the antenna is also sent to other terrestrial terminals within the network. Further, in one embodiment of this aspect of the present invention, the user can terminate its manual control over the antennas 2414 or input new geoposition data.

Figure 25:
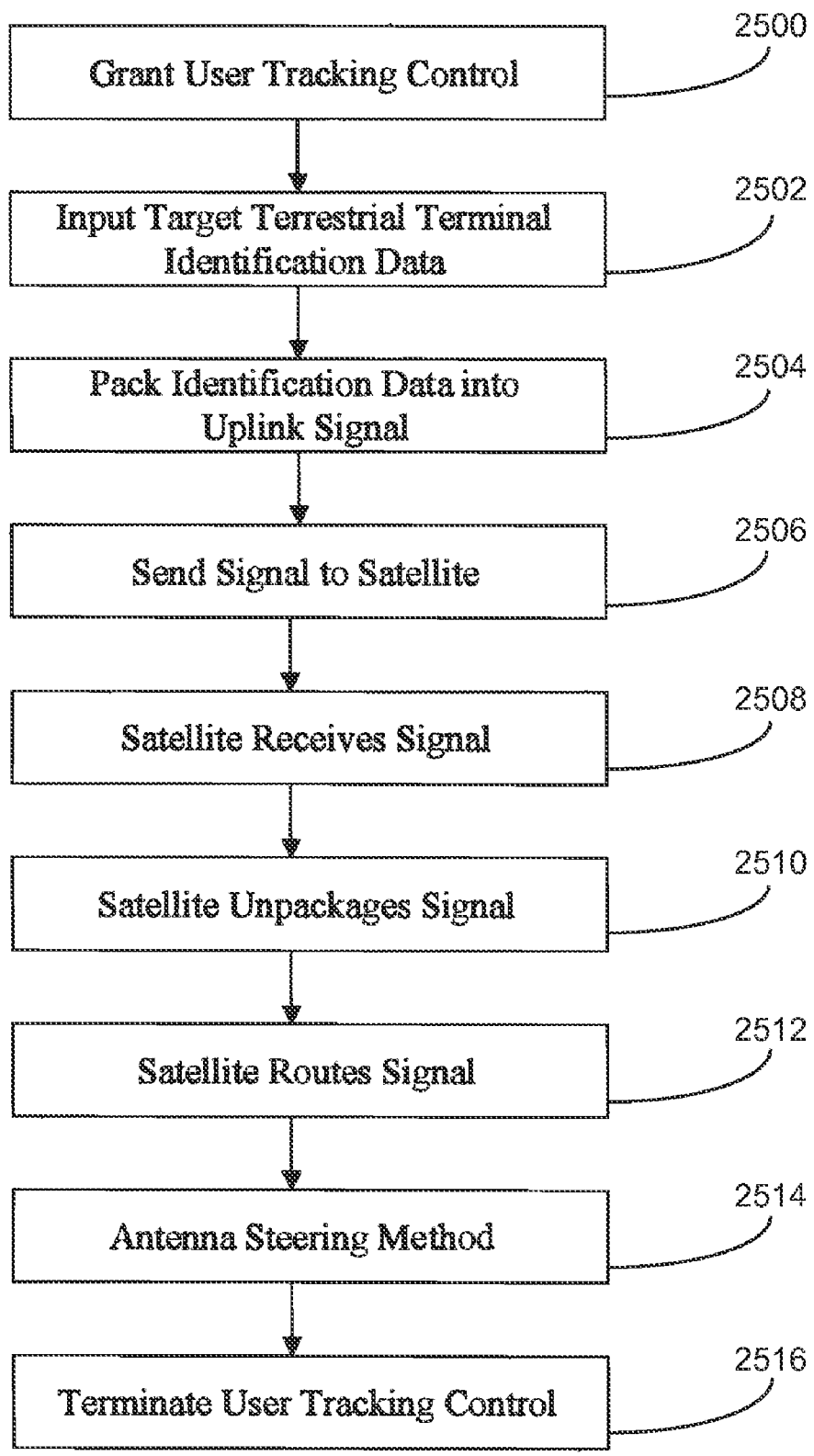
FIG. 25 shows, in flowchart form, steps associated with an embodiment of a method, according to the present invention, for providing tracking of a target terrestrial terminal through steering an antenna on a satellite.

Referring to FIG. 25, in one embodiment of the present invention, the request signal specifies a request for tracking a mobile terrestrial terminal by one of the steerable antennas on the satellite. After the user receives a confirmation of service signal 2500, the user requests tracking by submitting target terminal identification data into the initiating terrestrial terminal 2502. In an alternate embodiment of this aspect of the present invention, the user also alternatively submits geoposition data of the target terminal into the initiating terrestrial terminal. The target terminal may be the initiating terminal or another terrestrial terminal.

Figure 26:
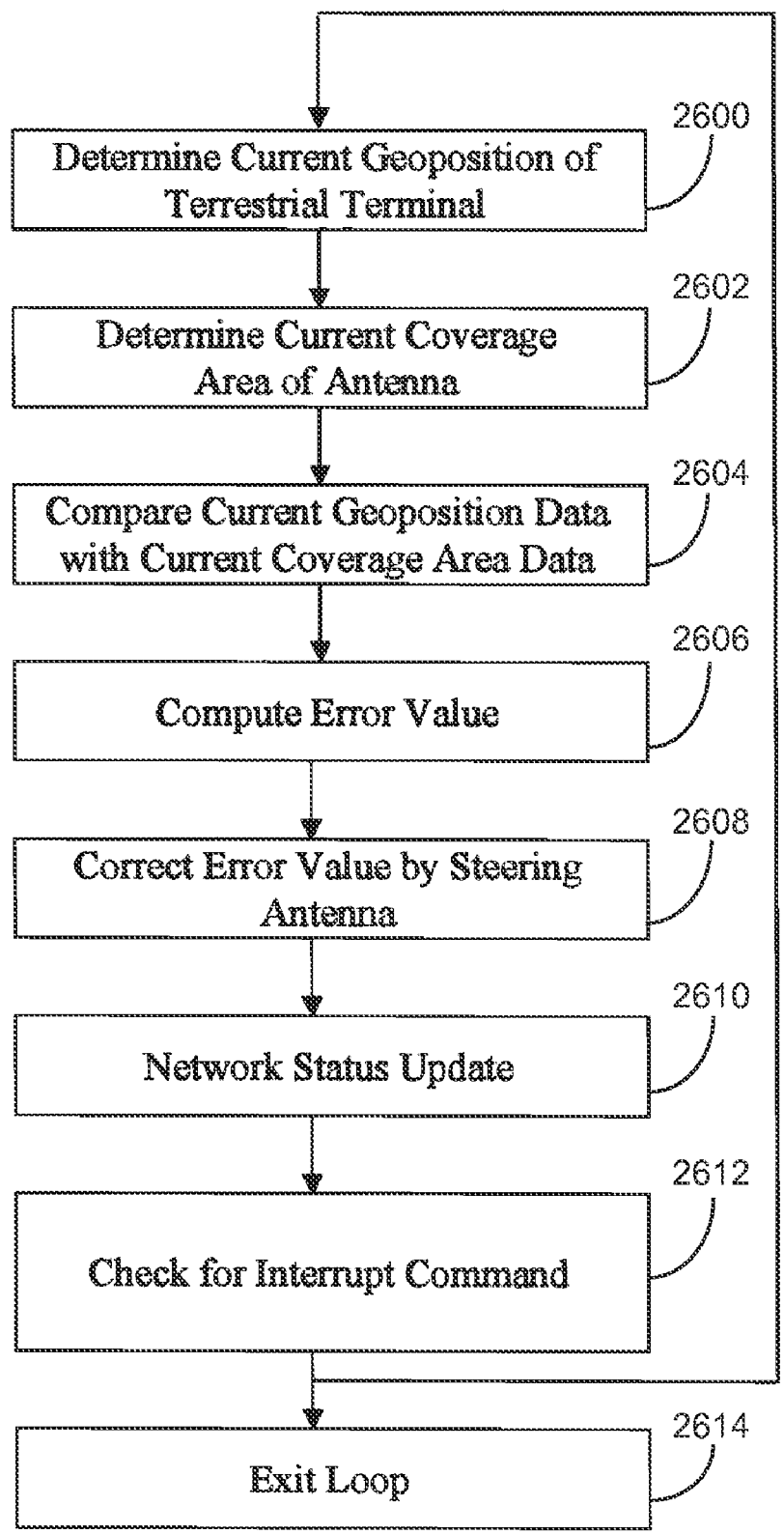
FIG. 26 shows, in flowchart form, steps associated with an embodiment of a method, according to the present invention, for a closed loop antenna steering method.

In one embodiment of one aspect of the present invention, the target terminal identification data is packed into an uplink signal 2504. In an alternate embodiment of the present invention, the target terminal identification data and target terminal geoposition data are packed into an uplink signal 2504. Further, in one embodiment, the uplink signal is sent to the satellite 2506 and the satellite receives 2508, unpackages 2510 and routes 2512 the uplink signal to an appropriate software engine. Still further, as shown in FIG. 26 in one embodiment of one aspect of the present invention, the software engine uses target terminal identification data and determines the current geoposition of that target terminal 2600. In an alternate embodiment of this aspect of the present invention, the software engine determines the geoposition data of the target terminal from the uplink signal 2600.

Still further, the software engine determines the current coverage area of the antenna to be controlled 2602 and compares this area to the geoposition data of the target terminal 2604. The satellite can compare the geoposition information in a variety of ways. In one embodiment, the satellite can compare the geoposition data corresponding to the center of an antenna's footprint to the geoposition data sent by the user that corresponds to the current position of the target terrestrial terminal. This comparison may in general be subject to error 2606, which is then corrected to ensure proper coverage by the antenna. The error is corrected, in one aspect of the present invention, through steering the antenna 2514, 2608. This method of receiving geoposition data, creating an error value and correcting the error value is processed automatically and in real time on-board the satellite 2610, as opposed to processing through a ground hub located in the earth segment. In an embodiment of an aspect of the present invention, the system runs the method continuously, while in an alternative embodiment of this aspect of the present invention the system runs the method at predetermined intervals. In one embodiment of one aspect of the present invention, it is possible to specify consecutive changes of the coverage area while conducting signal level measurements to calculate the geoposition of a jamming signal by triangulation. The jamming signal geoposition data may then be routed to the earth segment and specific user(s).

Finally, the method continues until an interrupt command 2612 is encountered 2516, 2614. This interrupt command 2612 can take many forms. In one embodiment, the user can request that the satellite control functionality terminate. In another embodiment, the interrupt command 2612 can result from the steering of the antenna outside a predetermined area. In this latter embodiment, the satellite control service can either terminate or continue. If the service continues, the request is routed to another satellite in the system and the closed loop mobile terminal tracking method is processed on-board the new satellite. In yet other embodiments of this aspect of the present invention, other predetermined triggers for interrupt commands 2612 can be programmed into the satellite. These predetermined triggers can be tied to billing, geographical constraints, and interference or general system coverage constraints.

Figure 27:
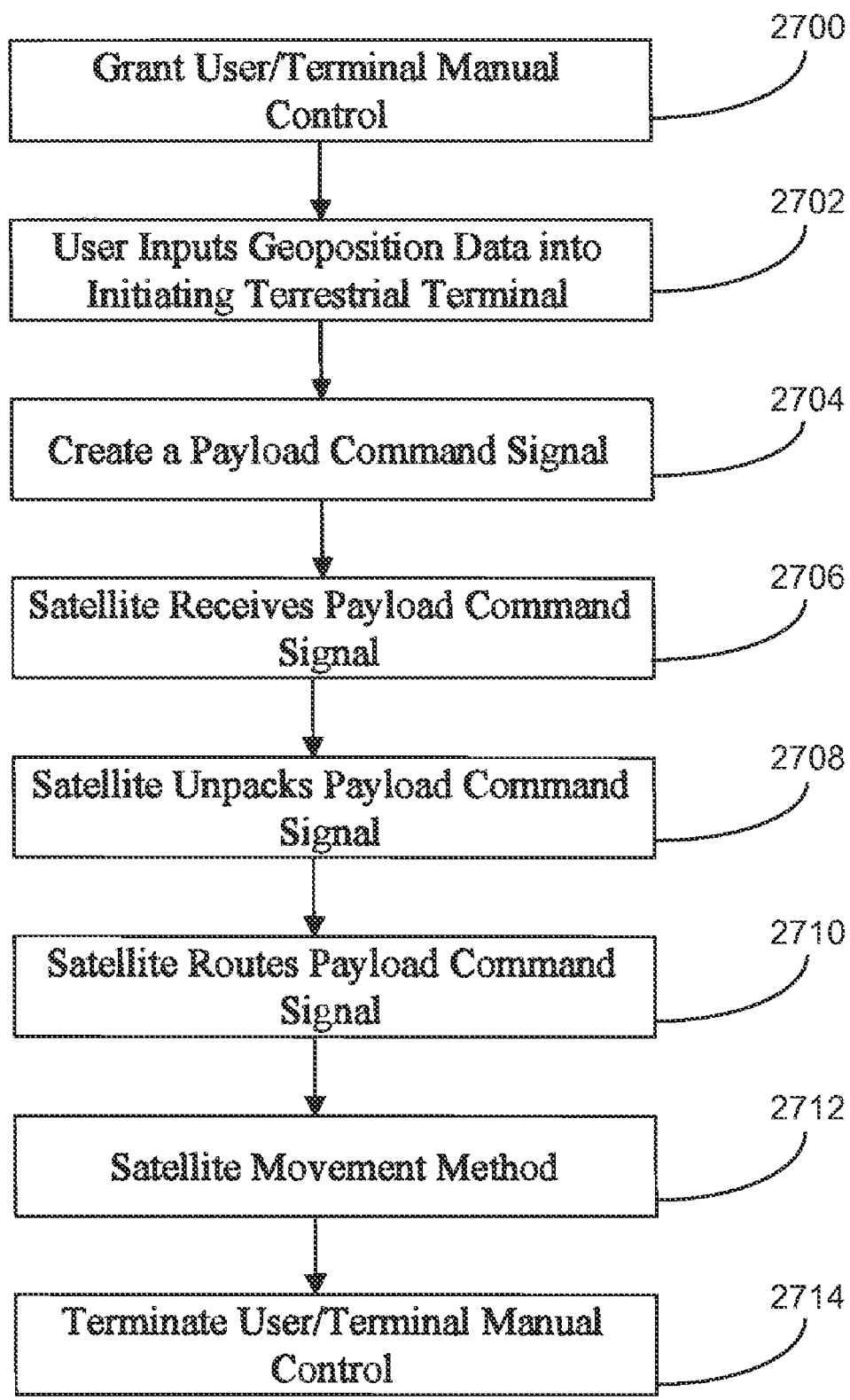
FIG. 27 shows, in flowchart form, steps associated with an embodiment of a method, according to the present invention, for providing customer/user control of the movement of a satellite.

Referring to FIG. 27, the request signal, in an aspect of the present invention, specifies a request for manual control of the orbital position of one or a plurality of satellites. After the user receives a confirmation of service signal 2700, the user can control from the initiating terrestrial terminal the orbital position of one or a plurality of satellites. In another embodiment, other terrestrial terminals within the network also receive a confirmation of service signal. In one embodiment of this aspect of the present invention, the user inputs geoposition data corresponding to the desired satellite coverage area into the initiating terrestrial terminal 2702, which is packaged into a payload command signal 2704. The satellite receives 2706 and unpacks 2708 the payload command signal and routes the signal to an appropriate software engine 2710. The software engine uses the geoposition data sent from the terrestrial terminal to move the satellite to the specified location 2712. The new geoposition of the satellite is sent then to the initiating terrestrial terminal. In another embodiment, the new geoposition of the satellite is also sent to other terrestrial terminals within the network. Further, in one embodiment of this aspect of the present invention, the user can terminate its manual control over the satellites 2714 or input new geoposition data.

Figure 28:
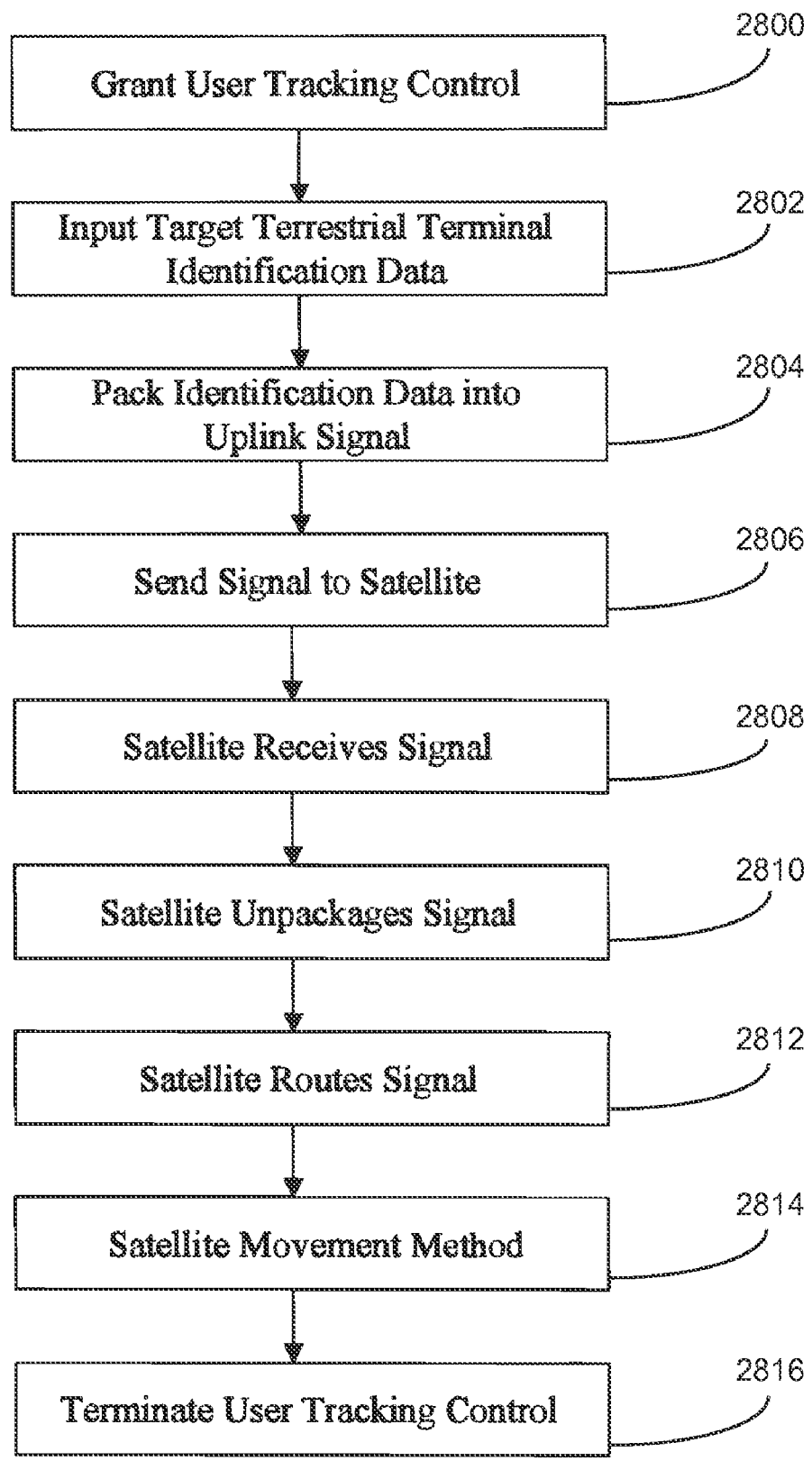
FIG. 28 shows, in flowchart form, steps associated with an embodiment of a method, according to the present invention, for providing tracking of a target terrestrial terminal through the movement of a satellite.

Referring to FIG. 28, in one embodiment of the present invention, the request signal specifies a request for tracking a mobile terrestrial terminal by changing the orbital position of a satellite. After the user receives a confirmation of service signal 2800, the user requests tracking by submitting target terminal identification data into the initiating terrestrial terminal 2802. In an alternate embodiment of this aspect of the present invention, the user also submits geoposition data of the target terminal into the initiating terrestrial terminal. The target terminal may be the initiating terminal or another terrestrial terminal.

Figure 29:
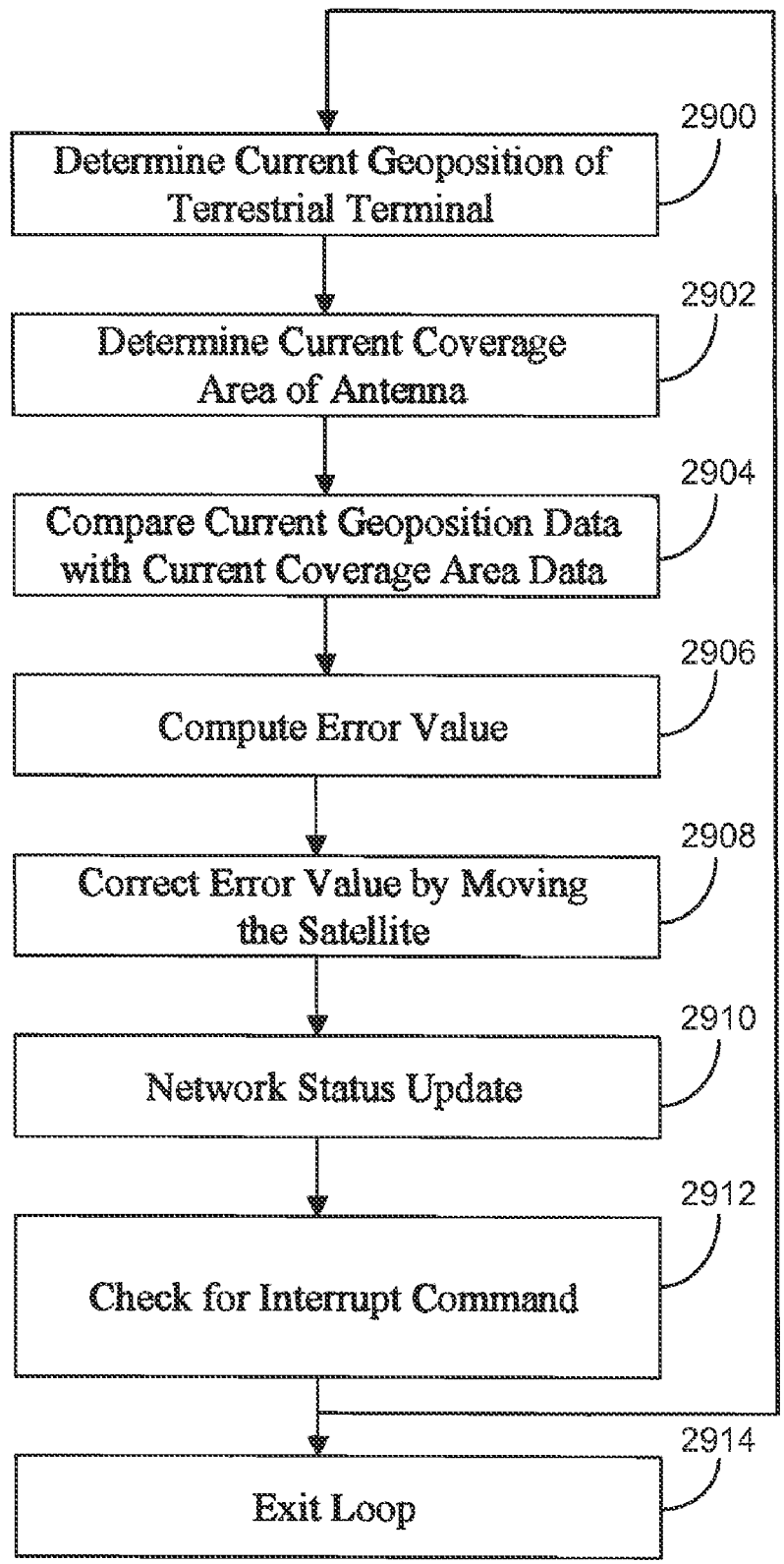
FIG. 29 shows, in flowchart form, steps associated with an embodiment of a method, according to the present invention, for a closed loop satellite movement method.

In one embodiment of one aspect of the present invention, the target terminal identification data is packed into an uplink signal 2804. In an alternate embodiment of the present invention, the target terminal identification data and target terminal geoposition data are packed into an uplink signal 2804. Further, in one embodiment, the uplink signal is sent to the satellite 2806 and the satellite receives 2808, unpackages 2810 and routes 2812 the uplink signal to an appropriate software engine. Still further, as shown in FIG. 29 in one embodiment of one aspect of the present invention, the software engine uses target terminal identification data and determines the current geoposition of that target terminal 2900. In an alternate embodiment of this aspect of the present invention, the software engine determines the geoposition data of the target terminal from the uplink signal 2900.

Still further, the software engine determines the current coverage area of the satellite to be controlled 2902 and compares this area to the geoposition data of the target terminal 2904. The satellite can compare the geoposition information in a variety of ways. First, the satellite can compare the geoposition data corresponding to the center of a satellite's footprint to the geoposition data sent by the user corresponding to the current position of the target terrestrial terminal. This comparison may in general result in an error value 2906. This error value should then be corrected to ensure proper coverage by the satellite. The error value is corrected, in one aspect of the present invention, through changing the orbital position of the satellite 2814, 2908. This method of receiving geoposition data, creating an error value and correcting the error value is processed on-board the satellite 2910, as opposed to processing through a ground hub located in the earth segment. In one embodiment of one aspect of the present invention, the system runs the method continuously, while in an alternative embodiment of this aspect of the present invention, the system runs the method at predetermined intervals.

Finally, the method continues until an interrupt command 2912 is encountered 2816, 2914. This interrupt command 2912 can take many forms. In one embodiment, the user can request termination of the satellite control functionality. In another embodiment, the interrupt command 2912 can result from movement of the satellite outside a predetermined area. In this embodiment, the satellite control service can either terminate or continue. If the service continues, the request is routed to another satellite in the system and the closed loop mobile terminal tracking method is carried out on-board the new satellite. In yet other embodiments of this aspect of the present invention, other predetermined triggers for interrupt commands 2912 can be programmed into the satellite. These predetermined triggers can be tied to billing, geographical constraints, interference or general system coverage constraints.

If the user privilege level allows, an aspect of the invention allows the user to switch between control of the antennas of the satellite and the orbital position of the satellite itself For example, in this embodiment, the request signal can specify that the satellite antennas track one or a plurality of mobile terrestrial terminals over predetermined range of areas. When the satellite antennas point outside this predetermined area, a software engine switches the control from adjusting the antennas to changing the orbital position of the satellite in order to track one or a plurality of mobile terrestrial terminals. In an alternative embodiment, the user requests control over the orbital position of the satellite itself for a predetermined area. When the satellite moves beyond this predetermined area, a software engine switches the control from changing the orbital position of the satellite to adjusting the antennas to track one or a plurality of mobile terrestrial terminals.

In an embodiment of one aspect of the present invention, the highest user privilege level of the system may enable the user to be aware of a jammer on a particular beam, whether a particular beam coverage includes a potential hostile monitoring asset and other assets available on the beam. Further, in this embodiment, the user may use this information for optimizing route choice for a signal. This embodiment is described by way of an example in which a user intends to send secure orders over a communications service via a satellite communications network to a hostile zone including hostile communications signals and intelligence assets. In this example of one embodiment of the present invention, the user may determine that there are three satellites collocated with three beams overlapping a desired target. In this situation, the user is able to determine that one of the beams is being actively jammed and another has a higher power than the third and might include a hostile passive interception element. Since this information is communicated to the user, the user, or on-board optimization software, can route the signal via the third beam, which has least chance of being jammed or intercepted.

According to another aspect of the present invention, the user is billed according to actual use of a satellite communications network. A satellite, in the network, may start a billing log according to actual use by referencing an internal clock to store a starting time corresponding to the initiation of satellite communications. The satellite references this clock, in one embodiment, once a user is approved for satellite access. Since approval may permit a variety of uses of the satellites in the network, a satellite may store, in addition to recording the starting time, the manner of use of the satellite. For example, in one embodiment, the satellite receives a request signal for direct control of a satellite antenna and records an indicator, in a billing log, corresponding to this manner of use.

Still further, a satellite may utilize its internal clock to store an amount of time a user utilizes a particular functionality. For example, in one embodiment, the user initially may request the satellite communications functionality but later may request the ability to directly control a satellite antenna. In this embodiment, the satellite stores the starting and ending times of the period of communication as well as the starting and ending times of direct satellite antenna control.

Still further, in another embodiment, the satellite can capture other billing-related information associated with service parameters such as bitrate throughput, roaming, satellite control, beam steering, security levels, priority class, size of the initiating terminal(s), size of the target terminals and other billing information.

In another embodiment of the present invention, the satellite monitors throughput rather than total time used. In this embodiment, the software in the satellite continuously monitors and stores the total amount of data transmitted for a specific session. The satellite stores the amount of data transmitted at the end of the session.

In another embodiment of the present invention, the satellite monitors the roaming time of the user during a session. When the session terminates, the total roaming time is stored in a record related to the user in a database.

In another embodiment, the user is charged a generic registration and license fee for use of the system and then billed on the basis of actual time used or amount of data transferred.

Billing information may be stored in a data structure, including a database or a call detail record identified to the account holder, the initiating and terminating callers and/or other unique identifying information, accessible by software engines. In one embodiment, billing information is automatically transferred with customer data, regardless of origin, location, or type of communication device used, when a user accesses within, to or from a satellite network.

In another embodiment, the billing system may include one or more levels of premier service and billing. In this embodiment, billing information includes the varying degrees of customer control of the sub-network and payload. Further, billing information may include varying levels of security and quality of service. Quality of service information may include customer controlled steerable antennas and customer control of the movement of the actual satellite.

In an additional embodiment of the present invention, the software on-board the satellite generates billing statements sent electronically to the user(s) of the system. In one embodiment of one aspect of the present invention, a software engine in the satellite queries a database containing billing information. The query, in one embodiment, retrieves the billing information necessary to form a bill. The bill may be calculated in a variety of manners, in which the specific manner depends upon the type of billing information used. For example, in one embodiment, the satellite utilizes the actual amount of time a user utilized the satellite communications functionality of the network and applies a flat rate to this actual use. Alternatively, the satellite may utilize the manner of use billing information in order to apply a differential rate to account for the various methods of using the network, i.e. applying different rates for satellite antenna control as opposed to basic point-to-point communication over the network.

In one embodiment of the present invention, the bill is a line-item description of usage and charges for those uses. Further, the software engine, in one embodiment, formats the billing information into an organized form and packages the formatted information into a downlink signal. Still further, the satellite transmits the downlink signal comprising the formatted information to a specific terrestrial terminal or group of terrestrial terminals. The downlink signal may be encrypted to protect the secrecy of the information.

The method of generating billing statements, in one embodiment, is performed on-board one satellite. Alternatively, multiple satellites may be used to generate a billing statement. Still further, the billing statement may be generated at the terrestrial terminal level.

In one embodiment of the invention, one or a plurality of satellites start a billing log when a channel open handshake signal is received from a target terrestrial terminal. In one embodiment of one aspect of the present invention, the log may reside on one satellite or it may be spread amongst multiple satellites in the network. The log may be started in a variety of ways. In an embodiment featuring point to multi-point service, a satellite starts a log as soon as the broadcasting terminal receives its first channel open handshaking signal. Alternatively, with point to multi-point service, a satellite starts a log as soon as the broadcasting terminal sends a start of call service signal packet uplink to a satellite.

Also, the log may be closed in a variety of ways. In one embodiment, the log ends when the original uplink sends a termination of call signal. Alternatively, the log may end when a predetermined condition is encountered, an example of which is antenna movement outside a specific geographic area. At this point, the satellite stores the on-board time and data transfer in a data structure which may include a database. In an alternate embodiment, logging the above information can be implemented in the terrestrial terminals instead of, or in addition to, on-board the satellite(s).

In an alternate embodiment of an aspect of the present invention, information concerning satellite communications network use may be stored in a data structure that may include a database. Further, the system may monitor and store efficiency statistics concerning the network. In another embodiment of the present invention, the system monitors and stores information concerning the number of users of the network, the amount of bandwidths, bandwidths used over time, type of services requested, routing statistics and peaks over time. In an alternate embodiment, the system monitors and stores information concerning all activities necessary in order to most efficiently optimize the network. Satellite communications network use information may be encrypted for security reasons.

In an embodiment of another aspect of the present invention, the system transmits on-board billing and network use information via a downlink signal to a system administrator. The transmission may be done on a monthly or other periodic basis. The system may transmit the information upon a request from a system administrator.

Figure 32:
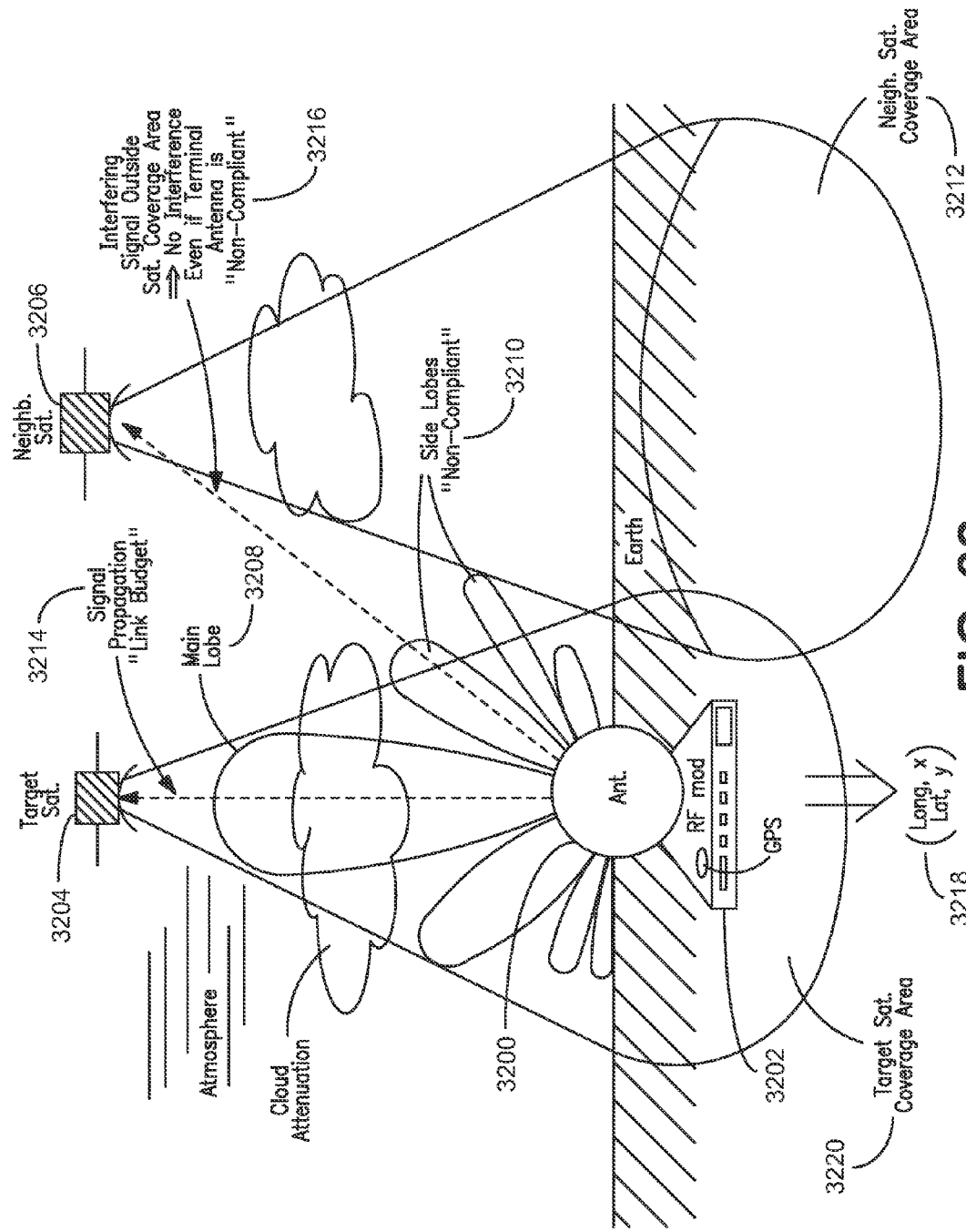
FIG. 32 shows a high-level view of satellite interference from a non-compliant terminal antenna.

Referring to FIG. 32, an embodiment of systems and methods according to another aspect the present invention involves communicating with satellites via non-compliant antennas 3200. The embodiment is described by way of an example involving terrestrial terminals 3202, one or a plurality of satellites 3204, 3206, a coordination database, an interference calculation and antenna electromagnetic radiation patterns, illustrated by main 3208 and side 3210 lobes, that are determined either by measurements or calculations using an antenna simulation device. The antenna simulation device, in one embodiment, performs calculations of the antenna radiation performance pattern.

An embodiment of one aspect of the present invention involves a device integrated into terrestrial terminals 3202, particularly mobile terrestrial terminals. The device performs interference calculations to determine whether a terrestrial terminal antenna 3200 can connect to a satellite system 3204. The device may receive information concerning geographic coordinates of the terrestrial terminal 3202 to be coordinated as well as relevant transmission parameters, orbital positions of satellites 3206 in the non-compliance regions of the antenna radiation zones 3210, the corresponding satellite coverage 3212, frequency and time planning. The device, in one embodiment, uses this information to perform an up-to-date and realistic interference calculation for the mobile terrestrial terminal 3202 in the current environment. In one embodiment of the present invention, the device determines whether the mobile terrestrial terminal 3202 can safely operate and the extent of operation available in the current environment. The device, in another embodiment, may determine possible slots for non-compliance operations.

Another aspect of the present invention provides for a coordination database. The coordination database, in one embodiment, is located on-board one or a plurality of satellites in a satellite communications network. In an alternate embodiment, the database may be located anywhere in an earth segment. In yet another alternate embodiment, the coordination database is located in a terrestrial terminal. The coordination database, in one embodiment of the present invention, keeps track of geographic coordinates of satellite coverage 3218, orbital positions of satellites in the satellite communications fleet, frequency, and time planning in real time.

One embodiment of one aspect of the present invention is a method to provide users the ability to communicate with satellites using normally non-compliant systems. In one embodiment of the invention, the user supplies an operator data concerning the non-compliant system. The data concerning the non-compliant system, in one aspect of this invention, comprises antenna geometry, antenna design, measured radiation patterns, radio frequency ("RF") equipment information, frequency, power levels, bandwidth and waveforms. Further, in one embodiment of the present invention, the system scans for satellite capacity where regions that will be affected by the non-compliance of the antenna do not have any satellites operating in the same frequency band. In an alternate embodiment of the present invention, the system scans for satellite capacity where the satellites that will be affected by the non-compliance of the antenna do not have the same coverage area 3212, 3220. Alternatively, the system may scan where the satellites that will be affected by the non-compliance of the antenna do not have the same frequency plan in the frequency band affected by the non-compliance transmission. The device scans for available capacity, in one embodiment, on a link budget 3214 and non-interference basis. In this embodiment, a proper link budget 3214 is established for the terminal 3202 and the satellite to communicate with 3204, resulting in a power density propagation towards neighbouring satellites 3206. Further, in this embodiment, a non-interference basis then means that it should be possible to prove that the potential harmful radiation from the source will not cause any interference on the neighbouring service satellites 3216. By way of example, in this embodiment, if the neighbouring satellite 3206 does not have the same coverage area 3212 as where the interfering terminal 3202 is transmitting 3210 it will not be a problem. By way of another example, in this embodiment, if the neighbouring satellite 3206 does not use the same frequency as the interfering terminal 3202 it will not be a problem. The system, in an alternate embodiment, may use RF transmission parameters orthogonal to the proposed transmission or partly orthogonal—orthogonal to the amount needed in order to become compliant with respect to the transmitted power densities to allow transmission. Still further, a device is integrated into the terrestrial terminal 3202 attempting to utilize the satellite communications network.

In an embodiment of an aspect of the present invention, when the terrestrial terminal 3202 attempts to connect to the satellite communications network, the terrestrial terminal's antenna 3200 points towards a target satellite 3204. Before the satellite connection is initiated, the terrestrial terminal 3202 transmits geoposition data to a software engine or the device. The terrestrial terminal 3202 transmits necessary equipment configurations to a software engine or the device, and the received satellite signal to a software engine or the device. The device conducts an up-to-date interference calculation, according to an aspect of the present invention, for the terrestrial terminal 3202 and the device determines whether the terrestrial terminal 3202 can operate in the current environment and the extent to which the terrestrial terminal 3202 can operate. The device transmits a confirmation/denial signal to the terrestrial terminal 3202 indicating whether the terrestrial terminal 3202 can connect safely to the satellite communications network. If the device transmits a confirmation signal, the terrestrial terminal 3202 connects to the satellite communications network via a satellite 3204. The device continuously monitors the interference environment. In this embodiment, if the device determines that the interference environment has deteriorated, the device can send a shut down command to the terrestrial terminal 3202. Upon receiving a shut down command, the transmission ceases.

Other objects, advantages and embodiments of the various aspects of the present invention will be apparent to those who are skilled in the field of the invention and are within the scope of the description and the accompanying figures. For example, but without limitation, structural or functional elements might be rearranged, or method steps reordered, consistent with the present invention. Similarly, processors or databases may comprise a single instance or a plurality of devices coupled by network, databus or other information path. Similarly, principles according to the present invention, and systems and methods that embody them, could be applied to other examples, which, even if not specifically described here in detail, would nevertheless be within the scope of the present invention.

What is claimed is:

1. A method for controlling an antenna of a satellite in a satellite communications network, wherein the satellite comprises an on-board software processor and the antenna is steerable and has a coverage footprint, the method comprising the steps of:
   (a) packing an uplink signal with data in connection with a target terrestrial terminal in the satellite communications network and sending the uplink signal to the satellite, wherein the data is selected from the group consisting of identification data, geoposition data and combinations thereof;
   (b) receiving, demodulating and unpacking the uplink signal to determine the current geoposition of the target terrestrial terminal;
   (c) comparing geoposition data corresponding to the center of the current coverage footprint of the antenna to be controlled with the current geoposition of the target terrestrial terminal;
   (d) creating an error value based on the comparison; and
   (e) correcting the error by steering the antenna to be controlled to ensure coverage of the target terrestrial terminal,
   wherein steps (b)-(e) are performed in real time by the on-board software processor.

2. The method according to claim 1, wherein the target terrestrial terminal is non-spaced based and is selected from the group consisting of terminals on terra firma, terminals in sea-borne platforms and terminals in air-borne platforms.

3. The method according to claim 1, wherein the uplink signal is packed with identification data and geoposition data of the target terrestrial terminal.

4. The method according to claim 1, wherein the method runs continuously until an interrupt command is received.

5. The method according to claim 1, wherein the method runs at predetermined intervals until an interrupt command is received.

6. The method according to claim 1, wherein the coverage area of the antenna to be controlled is subject to consecutive changes.

7. The method according to claim 1, wherein the uplink signal is sent by the target terrestrial terminal.

8. The method according to claim 1, wherein the uplink signal is sent by a terrestrial terminal that is not the target terrestrial terminal.

9. The method according to claim 1, wherein the method runs consecutive changes of the coverage area while conducting signal level measurements to calculate the geoposition of a terrestrial terminal that is not the target terrestrial terminal.

10. The method according to claim 1, wherein the uplink signal is also packed with an authorization code, and further comprising the steps of authenticating the authorization code and authorizing communication by the on-board software processor.

\* \* \* \* \*